(12) United States Patent
Chatterjee et al.

(10) Patent No.: US 12,523,902 B2
(45) Date of Patent: Jan. 13, 2026

(54) OPTICALLY ADDRESSABLE LIGHT VALVES FOR HIGH POWER OPERATION

(71) Applicant: Lawrence Livermore National Security, LLC, Livermore, CA (US)

(72) Inventors: Bikramjit Chatterjee, Livermore, CA (US); Lars F. Voss, Livermore, CA (US); Clint Frye, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 18/772,033

(22) Filed: Jul. 12, 2024

(65) Prior Publication Data
US 2024/0385474 A1 Nov. 21, 2024

Related U.S. Application Data

(63) Continuation of application No. 18/542,455, filed on Dec. 15, 2023, now Pat. No. 12,099,269, which is a
(Continued)

(51) Int. Cl.
*G02F 1/1333* (2006.01)
*G02F 1/1343* (2006.01)

(52) U.S. Cl.
CPC .... *G02F 1/133385* (2013.01); *G02F 1/13439* (2013.01)

(58) Field of Classification Search
CPC .......... G02F 1/133385; G02F 1/13439; G02F 1/133362; G02F 1/135
See application file for complete search history.

(56) References Cited

U.S. PATENT DOCUMENTS 5,029,335 A * 7/1991 Fisher ................... H01S 3/0941
174/16.3
5,446,563 A 8/1995 Takashi
(Continued)

FOREIGN PATENT DOCUMENTS

CN 215986816 3/2022
JP 2000031523 1/2000
(Continued)

OTHER PUBLICATIONS

International Search Report and Written Opinion in International Application No. PCT/US2024/037574 dated Nov. 28, 2024 in 11 pages.
(Continued)

*Primary Examiner* — Charles S Chang
(74) *Attorney, Agent, or Firm* — Knobbe, Martens, Olson & Bear, LLP

(57) ABSTRACT

An optically addressable light valve comprises a first transparent conductor layer, a layer of liquid crystal, and a photoconductor comprising an ultrawide band gap (UWBG) semiconductor. The liquid crystal is between the first transparent conductor layer and the semiconductor photoconductor. The optically addressable light valve is configured to apply a voltage across the liquid crystal and the UWBG semiconductor. A second transparent conductor may be formed in the UWBG semiconductor in some configurations, and the voltage may be applied across the first and second transparent conductor.

20 Claims, 10 Drawing Sheets

Related U.S. Application Data continuation-in-part of application No. 17/994,698, filed on Nov. 28, 2022.

(60) Provisional application No. 63/264,779, filed on Dec. 1, 2021.

(56) References Cited

U.S. PATENT DOCUMENTS

| | | |
|---|---|---|
| 10,747,033 B2 | 8/2020 | DeMuth et al. |
| 12,099,269 B2 | 9/2024 | Chatterjee et al. |
| 2006/0251140 A1* | 11/2006 | Lee .......... H01S 5/024 372/99 |
| 2012/0113334 A1 | 5/2012 | Minami et al. |
| 2012/0212466 A1 | 8/2012 | Kohtoku |
| 2020/0220036 A1 | 7/2020 | Azize |
| 2020/0346283 A1 | 11/2020 | Demuth et al. |
| 2021/0311211 A1 | 10/2021 | Xu et al. |
| 2021/0396370 A1 | 12/2021 | Kessels et al. |
| 2024/0142814 A1 | 5/2024 | Chatterjee et al. |

FOREIGN PATENT DOCUMENTS

| | | |
|---|---|---|
| JP | 2012-185334 | 9/2012 |
| WO | WO 2023/101903 | 6/2023 |

OTHER PUBLICATIONS

Du et al., "Research on High Power Laser Damage Resistant Optically Addressable Spatial Light Modulator," Photonics, vol. 9, Issue 11, 2022, 12 pages.

Hall et al., "Photoconductive Switch With High Sub-Bandgap Responsivity in Nitrogen-Doped Diamond," IEEE Electron Device Letters, vol. 41, No. 7, pp. 1070-1073 (Jul. 2020).

International Search Report and Written Opinion dated Mar. 31, 2023 in Application No. PCT/US2022/051051 in 9 pages.

Stolz et al., "Higher laser fluence ITO coatings utilizing a Fabry-Perot thin film filter to reduce effective absorption," Optics Express, vol. 29, No. 15, Jul. 2021, 24032-24044.

* cited by examiner

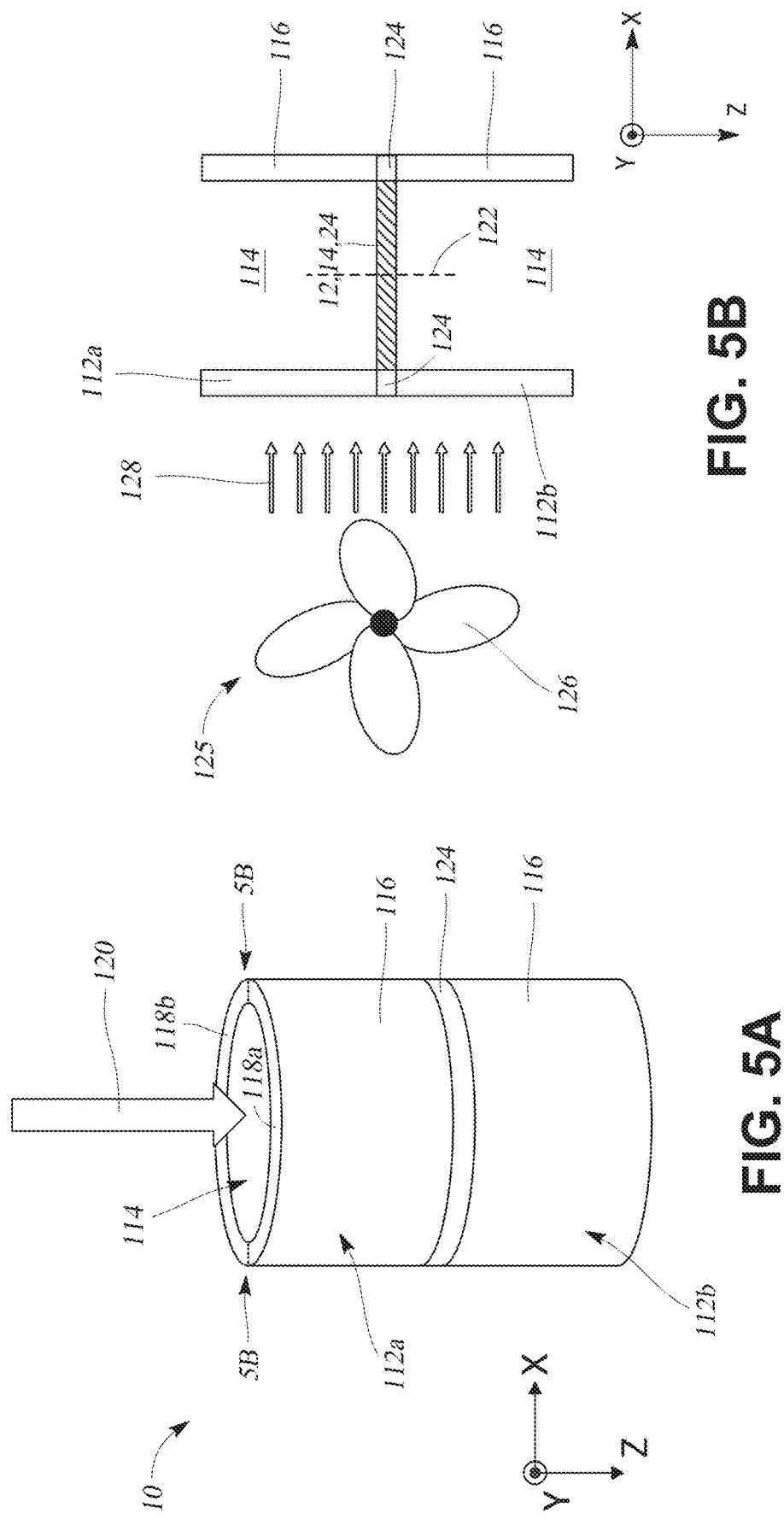

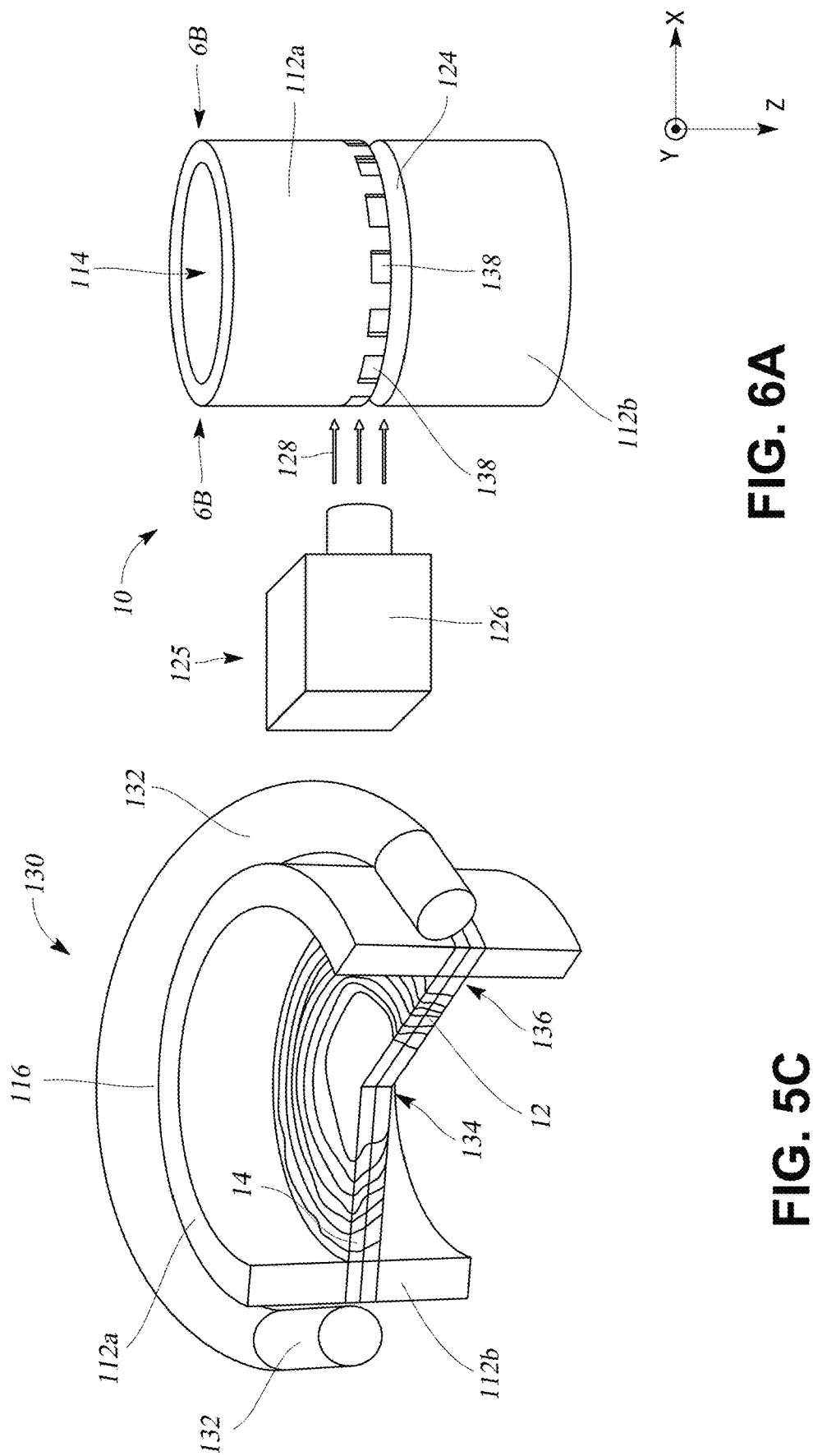

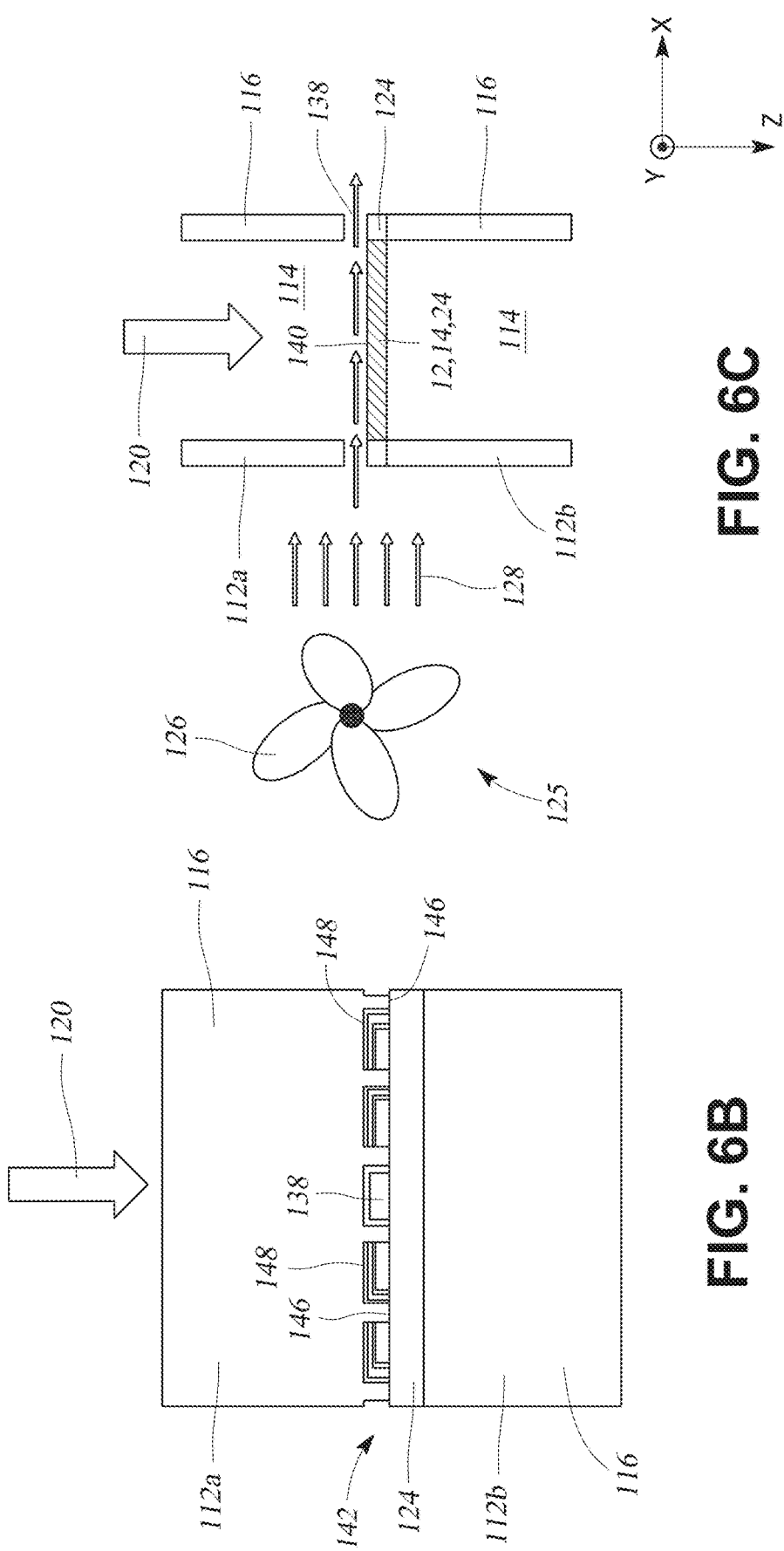

OPTICALLY ADDRESSABLE LIGHT VALVES FOR HIGH POWER OPERATION

CROSS-REFERENCE TO RELATED APPLICATIONS

This application is a continuation of U.S. patent application Ser. No. 18/542,455, entitled "OPTICALLY ADDRESSABLE LIGHT VALVES FOR HIGH POWER OPERATION," filed Dec. 15, 2023, which is a continuation-in-part of U.S. patent application Ser. No. 17/994,698, entitled "OPTICALLY ADDRESSABLE LIGHT VALVES," filed Nov. 28, 2022, which claims the benefit of priority to U.S. Provisional Application No. 63/264,779, entitled "OPTICALLY ADDRESSABLE LIGHT VALVES," filed Dec. 1, 2021. The entirety of each application referenced in this paragraph is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field

The present disclosure relates generally to optically addressable light valves (OALVs), and more specifically to optically addressable light valves comprising ultra-wide band gap semiconductors, specially treated photoconductors, and/or additional optical components such as reflectors, polarizers, filters or any combination thereof.

Description of the Related Art

OALVs are used to control the spatial shape and/or intensity distribution of laser beams. OALVs may comprise of a number of elements such as a photoconductor, a pair of transparent conductors (TCs), and liquid crystal. The photoconductor and liquid crystal may be sandwiched between the two transparent conductors. The OALV may be operated by applying a voltage between the two transparent conductors, through the photoconductor and liquid crystal. The conductivity of the photoconductor is controlled with a control beam of light having a first wavelength, which generates charge carriers within the photoconductor material. This light may be spatially patterned, for example, by using a digital light projection system. At locations where the photoconductor becomes conductive, the voltage dropped across the photoconductor decreases and correspondingly increases across the liquid crystal. This increase in voltage across the liquid crystal actuates the liquid crystal. At the same time, an input beam of light from a laser or other light source that is to be spatially modulated or shaped is incident on the OALV. In the locations where the liquid crystal has changed state due to the increased voltage, the liquid crystal acts to change the polarization of the input beam. The input beam from the laser or light source then passes through a polarizer, allowing only light with the correct polarization to pass through. Depending on the design, the light from the control beam may cause the liquid crystal state to be such that the light passes or is blocked. OALVs can thus be used to control the intensity across the input light beam and therefore potentially the spatial shape of the input beam in real time.

SUMMARY

The present disclosure relates generally to improvements and alternative designs for optically addressable light valves. For example, various devices, systems and methods described herein include an optically addressable light valve comprising a high optical damage threshold ultra-wide band gap (UWBG) material such as $Ga_2O_3$, AlN, BN, and diamond. In particular, in various implementations, the photoconductor and/or TCs may comprise UWBG semiconductors, which can have significantly higher laser induced damage thresholds than other designs. Use of such ultra-wide band gap semiconductors may enable higher intensity lasers.

Other devices, systems and methods described herein employ a monolithic structure that integrates the photoconductor and TC into a single element. Some optically addressable light valves described herein may use two dimensional electron or hole gas as the TC to increase the laser induced damage threshold (LIDT). Use of deep level color centers or dopants in the semiconductor photoconductor may also enable conductivity modulation with below band gap light. Some architectures describe herein allow for reflective as well as transmissive optically addressed light valve designs.

In various implementations, for example, an optically addressable light valve comprises a first transparent conductor layer, a layer of liquid crystal, and a photoconductor comprising a semiconductor having a bandgap of at least 3.5 eV. The liquid crystal is between the first transparent conductor layer and the semiconductor photoconductor. The optically addressable light valve is configured to apply a voltage across the liquid crystal and the semiconductor photoconductor.

Also disclosed herein, is an optically addressable light valve configured to spatially modulate the intensity of an input beam of light. The optically addressable light valve comprises a first transparent conductor layer, a layer of liquid crystal, and a photoconductor comprising an ultra-wide band gap semiconductor. The liquid crystal is between the first transparent conductor layer and the ultra-wide bandgap semiconductor. The optically addressable light valve is configured to apply a voltage across the liquid crystal and said ultra-wide bandgap semiconductor photoconductor.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 5A-5C depict an OALV equipped with heat sinks to dissipate heat resulting from high power laser beams being incident on the OALV. FIG. 5A is a perspective view showing cylindrical shaped heat sinks situated on opposite sides of a photoconductor included as part of the OALV. FIG. 5B is a cross-sectional view of the heats sinks and layers of the OALV together with a fan disposed to direct air for providing cooling of the heat sinks. FIG. 5C is a cutaway perspective view of heat sinks on opposite sides of the layers of the OALV further comprising a liquid cooling system comprising a pipe for flowing liquid coolant.

FIGS. 6A-6C depict a heat sink with vents to facilitate flow of air or gas across the OALV. FIG. 6A is a perspective view, FIG. 6B is a front view, and FIG. 6C is a cross-section view showing the cylindrically shaped heat sink having vents therein.

FIG. 8A is a cross-sectional view, FIG. 8B is cut-away perspective view, and FIG. 8C is a top view showing of the heat sink with individual fins extending azimuthally about the heat sink. FIG. 8D shows such a heat sink additionally including vents to facilitate the flow of air or gas across the OALV.

DETAILED DESCRIPTION

Figure 1:
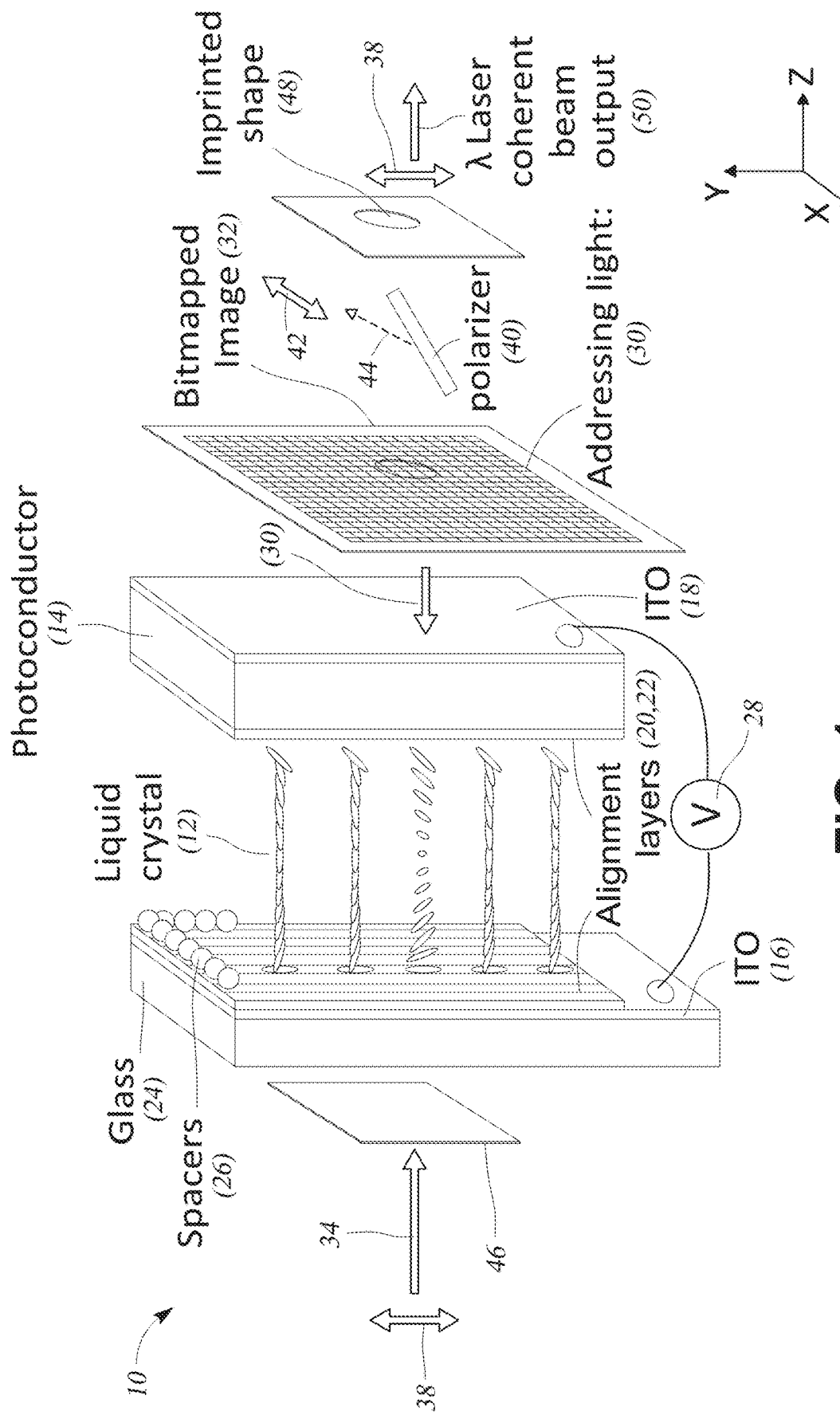
FIG. 1 is a schematic perspective view of an example of an optically addressable light valve (OALV).

As discussed above, an optically addressable light valve (OALV) 10 such as shown in FIG. 1 may comprise a layer of liquid crystal 12 and a photoconductor 14 disposed between first and second transparent conductors (TCs) 16, 18. The photoconductor 14 may comprise semiconductor. The first and second transparent conductors (TCs) 16, 18 may comprise indium tin oxide (ITO). The OALV 10 may further comprise first and second alignment layers 20, 22 for aligning liquid crystal molecules adjacent thereto. A substrate 24, such as a glass substrate may provide support for the liquid crystal 12 and/or the device 10. Spacers 26 may be disposed between the substrate 24 and the photoconductor 14, and in the configuration shown in FIG. 1, between the alignment layers 20, 22 to provide a space for the liquid crystal layer 12. A voltage source 28 may be electrically connected to the first and second transparent conductors 16, 18 to apply a voltage therebetween. Such a voltage is thereby applied across the layer of liquid crystal 12 and the photoconductor 14.

In various implementations, the photoconductor 14 may comprise ultra-wide band gap (UWBG) semiconductor. Example UWBG semiconductor materials that may be used for the photoconductor 14 include but are not limited to $Ga_2O_3$, AlN, AlGaN, BN, diamond, $Al_xGa_{(2-x)}O_3$ where $0 \leq x \leq 2$, Spinel gallates and aluminates such as: $ZnGa_2O_4$, $MgGa_2O_4$, $ZnAl_2O_4$, and $MgAl_2O_4$ or any combination thereof. Such UWBG materials can have extremely high bond strengths and critical electric fields, potentially giving them superior laser induced damage threshold (LIDT) compared to many other OALV materials. Consequently, higher peak and average power lasers and laser beams may be employed in the OALVs 10 comprising such UWBG semiconductors.

In various implementations described herein, the photoconductor 14 comprises semiconductor having a band gap of 4.0 eV, 4.1 eV, 4.2 eV, 4.3 eV, 4.4 eV, 4.5 eV, 4.6 eV, 4.7 eV, 4.8 eV, 4.9 eV, 5.0 eV, 5.1 eV, 5.2 eV, 5.3 eV, 5.4 eV, 5.5 eV, 6.0 eV, 6.1 eV, 6.2 eV, 6.3 eV, 6.4 eV, 6.5 eV, 6.6 eV, 6.7 eV, 6.8 eV, 6.9 eV, 7.0 eV or any range formed by any of these values (e.g., from 4.5 eV to 6.5 eV) although the band gap may be outside such ranges in some designs. In some implementations, for example, the photoconductor 14 comprises semiconductor having a band gap of 3.0 eV, 3.1 eV, 3.2 eV, 3.3 eV, 3.4 eV, 3.5 eV, 3.6 eV, 3.7 eV, 3.8 eV, 3.9 eV, 4.0 eV or any range formed by any of these values, although the band gap may be outside such ranges.

The OALV system 10 may further comprise a projector (not shown) configured to provide a control beam 30 comprising addressing light that is directed to and incident on the photoconductor 14. This control beam 30 may be incident on the photoconductor 14 from different sides in different designs. For example, in some configurations, the control beam 30 may be incident on the photoconductor 14 from same side as the liquid crystal layer 12 such that the control beam is transmitted through the liquid crystal layer to reach the photoconductor. In contrast, in other configurations (such as the example shown in FIG. 1), the control beam 30 may be incident on the photoconductor 14 from the opposite side as the liquid crystal layer 12 such that the control beam does not need to be transmitted through the liquid crystal layer to reach the photoconductor.

In various implementations, the control beam 30 has an intensity that is spatially modulated to provide for a patterned intensity. The projector may comprise, for example, a light source to produce the control beam 30 and a spatial light modulator to modulate the intensity of the control beam at different locations across the control beam. Accordingly, the control beam 30 may have a cross-section (e.g., parallel to the x-y plane of the xyz axis depicted in FIG. 1) that corresponds to a controlled intensity pattern or image 32. The variations in intensity at different locations across the cross-section of the control beam 30 (e.g., parallel to the xy plane in FIG. 1) will produce variations in the conduction of the photoconductor 14 at different locations on the photoconductor where the light from the control beam is incident on the photoconductor. For example, in various implementations, the control beam 30 may have a wavelength sufficiently short and the light therefore sufficiently energetic, to excite photocarriers in the semiconductor photoconductor 14. Variation in the intensity of the control beam 30, for example, across a cross-section of the control beam orthogonal to its length, will produced a similar spatial variation in density of photocarriers in the photoconductor 14 that are generated by the control beam.

As discussed above, at locations on the photoconductor 14 where the photoconductor becomes more conductive and less resistive as a result of generation of photocarriers by the control beam 30, the voltage drop across the photoconductor decreases. The portion of the voltage applied across the layer of liquid crystal 12 by the voltage source 28 correspondingly increases with decrease in voltage across the photoconductor 14. This increase in voltage across the liquid crystal layer 12 actuates the liquid crystal, changing the state of the liquid crystal molecules at the locations of increased voltage. At the locations where the liquid crystal 12 has changed state due to the increased voltage, the liquid crystal acts to change the polarization light incident thereon.

As discussed above, an input beam 34 of light to be acted on by the OALV may be directed onto the OALV 10 and the liquid crystal layer 12. This input beam 34 may originate from laser or light source (not shown in FIG. 1). This input beam 34 may, in some implementations, have a particular polarization state 38, such as a vertically linearly polarized state as shown in FIG. 1. This polarization state 38 may be changed by the liquid crystal layer 12 when the input light beam 34 passes through the liquid crystal layer that has be selectively activated by the change in voltage drop across the liquid crystal layer. As mentioned above, this spatial modulation in voltage drop across the liquid crystal layer 12 results when photocarriers are generated by exposing the photoconductor 14 to the control beam 30 having a spatially modulated intensity across its cross-section. The liquid crystal layer 12, may rotate or otherwise alter the polarization 38 of portions of the input beam 30 that pass through regions of the liquid crystal layer that have been activated. The amount of polarization rotation may be determined by the amount of voltage increase across the liquid crystal layer 30 at that location, which may be determined by the amount of photocarriers generated in the photoconductor 14, which may vary depending on the intensity of the control beam 30 at that location along the cross-section of the control beam orthogonal to its length.

In various implementations, the OALV 10 may include a polarizer 40 that receives the input beam 34 after being transmitted through the liquid crystal layer 12. This polarizer 40, may comprise, for example, a linear polarizer in some designs. The polarizer 40 in FIG. 1 comprises a polarization beamsplitter. This polarization beamsplitter may, for example, reflect light of one polarization state such as one linear polarization state (e.g., horizontal polarization) 42 and transmit light of another polarization state such as another linear polarization state (e.g., vertical polarization) corresponding to the polarization 38 of the input beam 34. The reflected light is shown in FIG. 1 as a beam 44 reflected from the polarization beamsplitter 40 and directed elsewhere. Other configurations are possible. For example, the polarization beamsplitter may reflect light of the original polarization 38 of the input beam 34 and transmit light of the other polarization state 42 such that the more the liquid crystal layer 12 changes the polarization of the input beam 34, the more light is transmitted through the polarizer 40. Still other configurations are possible.

The selective spatial modulation of the liquid crystal layer 12 by the spatially modulated control beam 30 can therefore selectively spatially modulate the input beam 34. Accordingly, the intensity of the input beam 34 across a cross-section thereof orthogonal to its length (e.g., parallel to the xy plane in FIG. 1) may be altered from a first spatial intensity distribution 46 to a second spatial intensity distribution 48. This second spatial intensity distribution 48 may be therefore patterned as desired by the OALV 10. The OALV 10 thus has an output beam 50 with a spatial intensity distribution across the cross-section of the output beam orthogonal to its length (e.g., parallel to the xy plane in FIG. 1) that can be controlled by the intensity distribution of the control beam 30 across the cross-section of the control beam orthogonal to its length.

Figure 2:
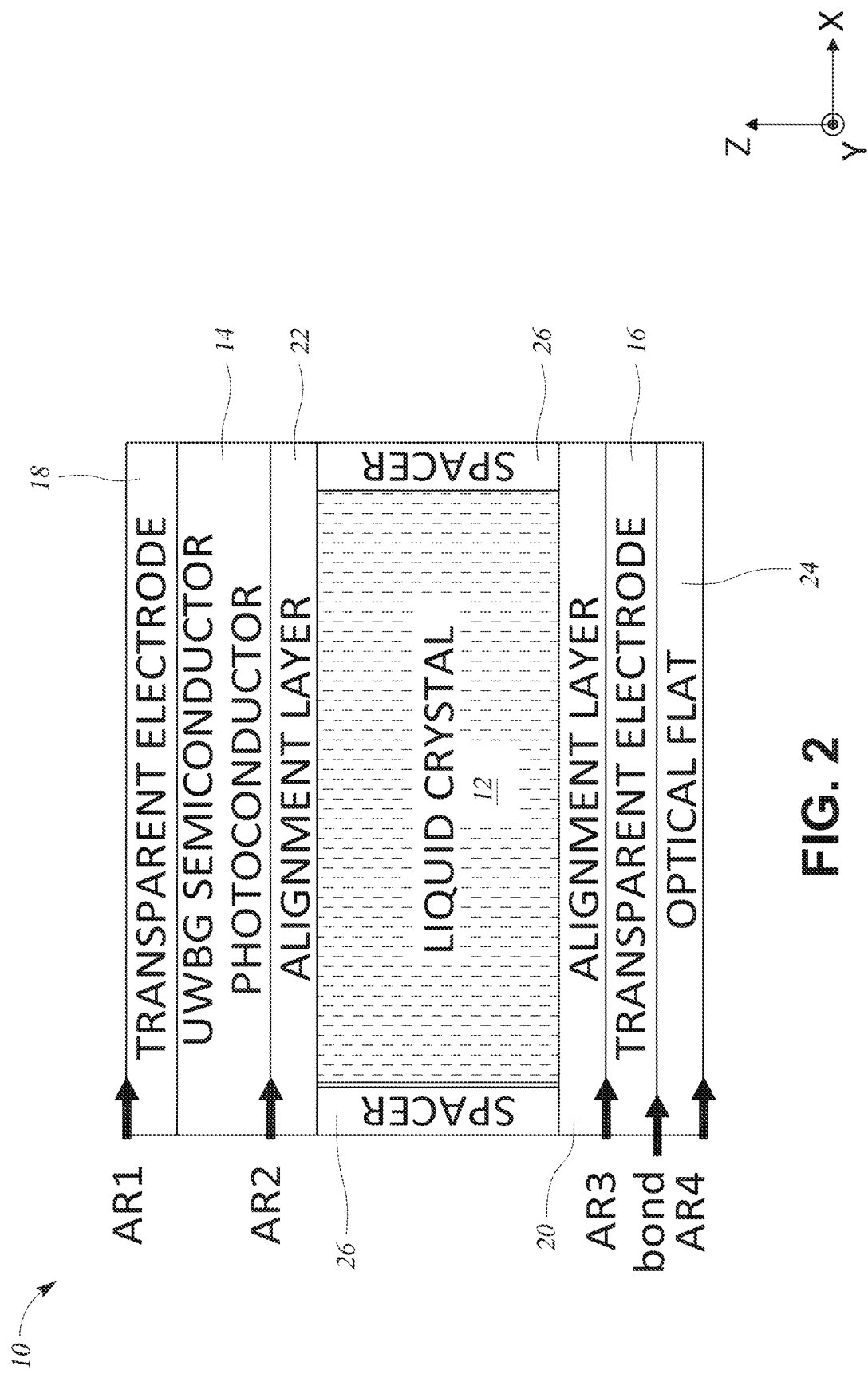
FIG. 2 is a schematic cross-sectional view of an OALV comprising an ultra-wide band gap semiconductor photoconductor.

FIG. 2 shows a cross-sectional view of an OALV 10 wherein the photoconductor layer 14 comprises UWBG semiconductor material. As in FIG. 1, the photoconductor 14 and the liquid crystal layer 12 are shown together between a pair of transparent electrodes 16, 18. First and second alignment layers 20, 22 are shown on opposite sides of the liquid crystal layer 12 while spacers 26 are shown separating the alignment layers to provide room for the liquid crystal. The various layers are included on the substrate 24 referred to in FIG. 2 as an optical flat. Anti-reflective coatings AR1, AR2, AR3, AR4 are shown on various surfaces or interfaces to reduce reflection. For example, a first anti-reflective coating (AR1) is shown on the exposed surface of the second transparent electrode 18. A second anti-reflective (AR2) coating is between the photoconductor 14 and the second alignment layer 22. A third anti-reflective coating (AR3) is between the first alignment layer 20 and the first transparent electrode 16. A fourth anti-reflective (AR4) coating is formed on the optical flat 24, for example, on the exposed surface thereof.

UWBG materials can have wide band gaps, for example, greater or equal to 4.0 eV or 4.5 eV. In various implementations described herein, the UWBG photoconductor comprises a semiconductor having a band gap of 4.0 eV, 4.1 eV, 4.2 eV, 4.3 eV, 4.4 eV, 4.5 eV, 4.6 eV, 4.7 eV, 4.8 eV, 4.9 eV, 5.0 eV, 5.1 eV, 5.2 eV, 5.3 eV, 5.4 eV, 5.5 eV, 6.0 eV, 6.1 eV, 6.2 eV, 6.3 eV, 6.4 eV, 6.5 eV, 6.6 eV, 6.7 eV, 6.8 eV, 6.9 eV, 7.0 eV or any range formed by any of these values (e.g., from 4.5 eV to 5.0 eV) although the band gap may be outside such ranges in some designs. To excite carriers via band-to-band photogeneration in such ultra-wide band gap semiconductors, shorter wavelengths, such as ultraviolet (UV) light may be employed. An excimer laser, mercury lamp, or other type of light source that outputs UV light may be employed as the light source for the projector in some such designs.

In various implementations described herein, however, impurity doping may be employed to create deep levels or color centers in order to enable below band gap photogeneration with, e.g., visible light. Examples of such dopants include N or P in diamond, Fe or Mg in $Ga_2O$, and O or Mg in AlN, but the dopants and semiconductor materials need not be limited to these.

Accordingly, the OALV 10 may comprise a semiconductor photoconductor 14 that includes deep level color centers or dopants such that the semiconductor photoconductor generates photocarriers in response to receiving visible light. Accordingly, such deep level color centers or dopants may have energy states deep within the band gap such that visible light can excite electrons from those deep level states nearer the conduction band than the valence band into the conduction band or holes from deep level hole states nearer the valence band than the conduction band into the valence band. This approach may advantageously reduce damage to the liquid crystal layer 12. Higher energy light such as UV light used in exciting an electron from the valence band to the conduction band of an ultra-high band gap semiconductor (or causing a hole to transition from the conduction band to the valence band) may be more likely to damage the liquid crystal than lower energy light such as visible light that can be used to cause transitions from deep level states in the band gap into the conduction band or valence band. Accordingly, in various implementations, the semiconductor photoconductor 14 includes deep level color centers or dopants that allow the control beam 30 to have a wavelength in the visible range.

Figure 3:
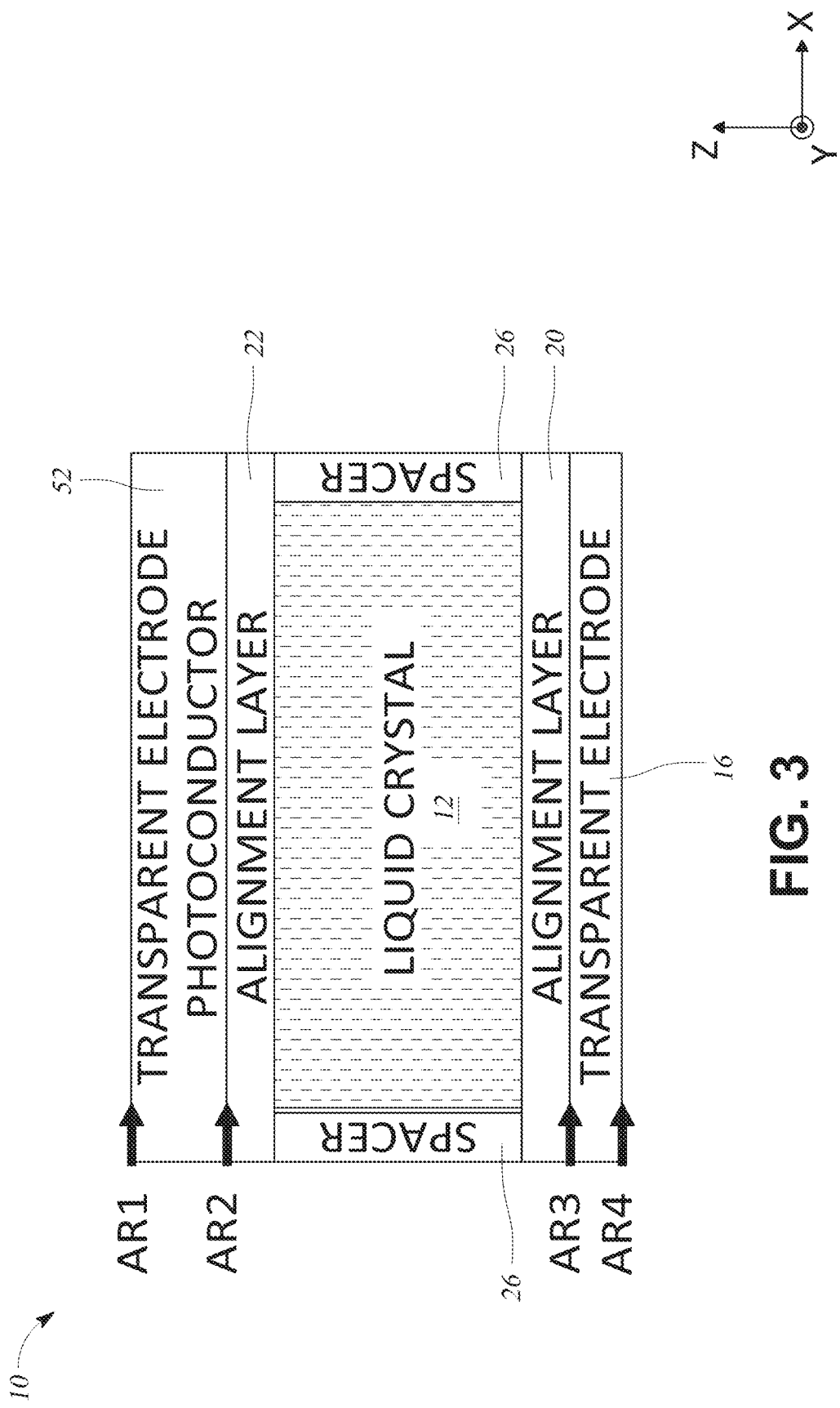
FIG. 3 is a schematic cross-sectional view of an OALV comprising semiconductor photoconductor having a transparent conductive region formed therein.

In some designs, the transparent conductor 18 can be integrated with the UWBG material of the photoconductor 14. A transparent conductive region may be formed in the semiconductor surface, for example, on a side opposite the liquid crystal layer 12. The second transparent conductor layer 18 may be formed in the semiconductor photoconductor 14 on one side (e.g., the side opposite the liquid crystal) such that the second transparent conductor layer and the semiconductor photoconductor comprise a single monolithic structure 52 as illustrated in FIG. 3. The conductive region can be formed in the semiconductor photoconductor 14 via impurity doping. Impurities in the semiconductor, for example, close to the surface of the semiconductor photoconductor 52 (on the side of the photoconductor opposite the liquid crystal layer 12) may create a conductive region in the semiconductor photoconductor. Accordingly, in various designs, semiconductor photoconductor 52 includes a sufficiently high amount of impurity dopants on a side of said semiconductor photoconductor opposite said liquid crystal to form a second conductive layer, the second conductive layer disposed in the semiconductor photoconductor (e.g., in, at or near the side of the semiconductor photoconductor opposite the liquid crystal layer). In various implementations, these dopants comprise shallow donor dopant to provide room temperature conductivity. These shallow level dopants in the photoconductor layer are sufficiently close in energy to the conduction band to provide significant room temperature conductivity and not need to be photo-excited to the conduction band to make the material conductive. Example of such dopants can include, Si, Sn, Ge, e.g., for $Ga_2O_3$, although the dopants should not be limited to these.

In various implementations these dopants are included throughout the depth of the photoconductive layer, although other configurations are possible.

This approach may be used regardless of whether the semiconductor photoconductor 52 is a UWBG semiconductor or not. The photoconductor 52 may comprise, for example, SiC (e.g., intrinsic SiC) which may be doped (e.g., n-type) or more highly doped on one side or otherwise have a layer of doped SiC (e.g., N—SiC) or more highly doped SiC thereon or on one side thereof to provide an electrically conductive region. As discussed above, the voltage source 28 may be electrically connected to this conductive region of the semiconductor photoconductor 52 (e.g., via an electrode or contact such as a ring-shaped, annular, or loop shaped contact comprising metal) and to the first transparent electrode 16 to apply a voltage across the photoconductor and the liquid crystal layer 12. As shown in FIG. 3, anti-reflective coatings AR1, AR2, AR3, AR4 can be included on various surfaces or interfaces to reduce reflection. For example, a first anti-reflective coating (AR1) is shown on the exposed surface of the photoconductor 52. A second anti-reflective (AR2) coating is between the photoconductor 52 and the second alignment layer 22. A third anti-reflective coating (AR3) is between the first alignment layer 20 and the first transparent conductor 16. A fourth anti-reflective coating (AR4) is formed on the first transparent conductor 16, for example, the exposed surface thereof.

In some designs, a two-dimensional electron (or hole) gas (2DEG) can be produced in the semiconductor photoconductor 52 to create a large free electron concentration and an associated conductive region without necessarily using impurities/impurity dopants in the semiconductor photoconductor for forming the conductive region. The second transparent conductor 18 can thus be formed in the semiconductor photoconductor 52 on the side opposite the liquid crystal layer 12. The second transparent conductor layer 18 may thus be formed in the semiconductor photoconductor 52 on one side (e.g., the side opposite the liquid crystal 12) such that the second transparent conductor layer and the semiconductor photoconductor comprise a single monolithic structure 52 as illustrated in FIG. 3. A variety of different materials may be employed to create the two-dimensional electron (or hole) gases in the semiconductor photoconductor 52. Such materials may comprise compound semiconductor in some implementations, and alloys thereof. In the cases, for example, materials such as AlN, $Ga_2O_3$, or GaN and alloys such as AlGaN can create a large free electron concentration. Such material, may for example be disposed in a layer on the semiconductor comprising the photoconductor. In some implementations, a plurality, possibly several or many layers (e.g., AlN/GaN/AlN/GaN etc.) may be included to achieve the desired conductivity. This approach of creating a two-dimensional electron (or hole) gas may be used with UWBG semiconductor photoconductors as well as with non-UWBG material such as GaAs and GaN. Creating a conductive region in the semiconductor photoconductor 52 using two-dimensional electron (or hole) gases can potentially increase the damage threshold of these materials substantially by reducing or eliminating the large number of impurity atoms used for producing high conductivity in the semiconductor photoconductor, which may act as damage initiation sites.

The electron (or hole) gas is considered to be effectively be at the surface of the semiconductor photoconductor 52. The interface between the photoconductor semiconductor and the overlying layer would create the 2DEG, which would allow one to apply a potential at the surface of the photoconductor. As discussed above, the voltage source 28 may be electrically connected to this conductive region of the semiconductor photoconductor 52 and to the first transparent electrode to apply a voltage across the photoconductor and the liquid crystal layer. One or more anti-reflective coating such as shown in FIG. 3 may also be used to reduce reflection.

Another approach to forming the transparent conductor in the semiconductor photoconductor 52 is to use a pump beam. A pump source may be located and configured to direct a pump beam onto the photoconductor 52. This pump beam may, for example, be incident on a side of the photoconductor 52 opposite of the liquid crystal layer 12. The pump source may be configured such that the pump beam has a pump wavelength sufficiently short to excite photoelectrons on a side of said semiconductor photoconductor opposite said liquid crystal. The pump wavelength may be shorter than the wavelength of the control beam 30. The control beam 30, which is used to control the bulk conductivity of photoconductor, may have a longer wavelength so as to be less absorbing than the pump beam. In contrast, the pump wavelength may be shorter such that the pump beam is more strongly absorbing so as to affect only the conductivity of the photoconductor 52 at or near the surface thereof. For example, for GaN or SiC wide band gap (WBG) semiconductors with bandgaps corresponding to wavelengths of ~365 nm and 380 nm, respectively, the pump wavelength could be less than these wavelengths. For UWBG semiconductor material having band gaps >4.0 eV, band-to-band excitation have a wavelength less than roughly 310 nm. Other wavelength however can be used for other implementations.

Accordingly, in various implementations the pump source and pump beam are such that the conductive region is formed in the semiconductor photoconductor 52 at or near the surface of the photoconductor, e.g., on the side of the photoconductor opposite to the liquid crystal layer. In various implementations, for example, the wavelength of the pump beam is sufficiently short to cause the pump beam to be absorbed within a distance that is no more than ¼ the thickness of semiconductor photoconductor 52. Absorption, however, will depend on energy difference between incident flux and bandgap. If shorter wavelengths are used, the distance can be reduced. Also, the absorption layer could be thicker or thinner depending on the thickness of photoconductor layer. Also depending on the design and the pump, the pump light may be fully absorbed within the photoconductive layer leaving a layer of unexcited photoconductor material adjacent to the liquid crystal. The distance, however, can vary with design. For example, the wavelength of the pump beam may be sufficiently short to cause the pump beam to be absorbed within a range of from 1 to 250 microns of the surface of the semiconductor photoconductor 52 although the distance should not be so limited.

Likewise, in various implementations, the pump source is configured and/or located such that the pump beam is incident on the semiconductor photoconductor 52 from the side of the photoconductor opposite to the liquid crystal. Similarly, the pump source may be configured and/or located such that the pump beam is not directed through the liquid crystal. The wavelength of the pump beam may, in various cases, be less than the wavelength of the input beam 34 to be patterned by the optically addressable light valve 10.

This approach of using a pump beam to form a conductive region in the semiconductor photoconductor 52, e.g., at or near the surface thereof, may be used regardless of whether the semiconductor photoconductor is a UWBG semiconductor or not. As discussed above, the voltage source 28 may be electrically connected to this conductive region of the semiconductor photoconductor 52 and to the first transparent conductor 16 to apply a voltage across the photoconductor and the liquid crystal layer 12.

Using the pump beam to provide a transparent conductive region at and/or near the surface of the semiconductor photoconductor 14 can potentially be an alternative to impurity doping, deposition of a transparent conductive oxide (TCO) such as indium tin oxide (ITO), or the use of a 2DEG as described above. Using the pump beam to provide a transparent conductive region has the potential benefit of precise control over the conductivity and the conductivity profile versus depth provide by wavelength and intensity, as well as avoiding the use of epitaxy or impurities which may introduce weak points.

Figure 4:
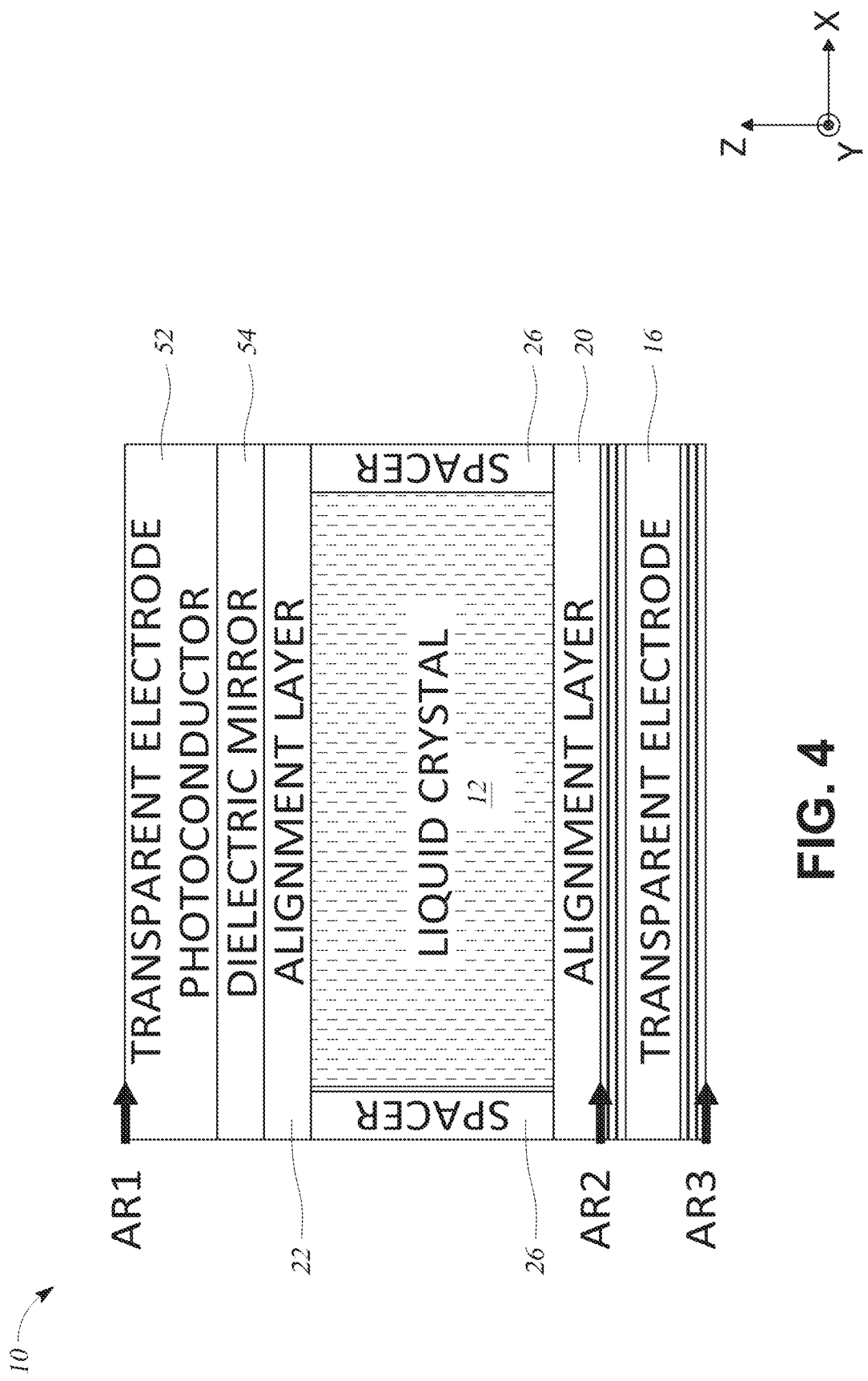
FIG. 4 is a schematic cross-sectional view of an OALV including a reflector configured to reflect an input beam to be patterned by said optically addressable light valve and/or the control beam configured to spatially modulate the conductivity of a photoconductor thereby spatially modulating the state of a layer of liquid crystal, which has the effect of spatially modulating the input beam.

FIG. 4 shows another OALV design that includes a reflector 54 such as a mirror or a dichroic reflector or filter that may be employed to configure the OALV 10 to be a reflective device. The integration of a reflector 54 may allow for reflective designs in which either the control beam 30 comprising the light that changes the conductance of the photoconductor 14, 52 and/or the input beam 34 comprising the light to be patterned, is reflected rather than transmitted through the device. This configuration has the potential advantage of being able to integrate active cooling and/or a heat sink into the backside of the device.

This reflector 54 may comprise a multilayer dielectric in some implementations. This reflector 54 may, for example, comprise an interference stack, interference filter or interference coating. In some implementations, this reflector 54 comprises a dichroic filter. Dichroic filters may comprise color filters that allow for the transmission or reflection of a specific wavelength or wavelengths, while rejecting others. Dichroic filters or reflectors may selectively reflect one wavelength or wavelength range and selectively transmit another wavelength or wavelength range. The integration of dichroics into the OALV design may be advantageous as the control beam 30 comprising addressing light or the input beam 34 comprising patterned light could be selectively reflected. In some designs, for example, the dichroic filter 54 may transmit the control beam 30 but reflect the input beam 34 in certain designs. In other designs, the dichroic 54 may allow for the transmission of the input beam 34 comprising the patterned light and the reflection of the control beam 30 comprising addressing light. If the control beam 30 comprising addressing light is of high enough energy to cause damage to "downstream" optics, sending the control beam back "upstream" may be useful, e.g., if high fluences are used to generate free carriers in the photoconductive layer 14 due to low absorption. Similar designs may have advantages in being able to reflect the control beam 30 comprising addressing light back through the photoconductor conductor 14, 52, which may allow for enhanced absorption while still transmitting the input beam 34 comprising a patterned beam. Likewise, in some implementations, the control beam 30 may be incident on the OALV from the side closer to the photoconductor 14, 52 than to the liquid crystal layer 12, or vice versa. The input beam 34 may also be incident on the OALV from the side closer to the photoconductor 14, 52 than to the liquid crystal layer 12, or vice versa. In some designs, both the control beam 30 and the input beam 34 are incident on the OALV from the side closer to the photoconductor 14, 52 than to the liquid crystal layer 12. However, in other designs, both the control beam 30 and the input beam 34 are incident on the OALV 10 from the side closer to the liquid crystal 12 than to the photoconductor layer 14, 52. Other configurations are possible.

This design that incorporates a reflector 54 in the OALV 10 may be used regardless of whether the semiconductor photoconductor 14, 52 is a UWBG semiconductor or not. As discussed above, one or more anti-reflective coatings may be used to reduced reflection. Anti-reflective coatings AR1, AR2, AR3, for example, are shown on various surfaces or interfaces of the OALV device 10 of FIG. 4. For example, a first anti-reflective coating (AR1) is shown on the exposed surface of the semiconductor photoconductor 52. A second anti-reflective (AR2) coating is between the first alignment layer 20 and the first transparent conductor 16. A third anti-reflective coating (AR3) is formed on the first transparent conductor 16, for example, the exposed surface thereof.

As discussed above, the OALV 10 may include a polarizer 40 such as a polarization beamsplitter. The OALV 10, for example, may operate by inducing a polarization shift in the input beam 34, which in then filtered using a downstream polarizer 40. Various designs may integrate this polarizer 40 into the OALV device 10. For example, the polarizer 40 may be included in a stack with any one or more of the other elements such as the photoconductor 14, 52, the layer of liquid crystal 12, the alignment layers 20, 22, the first transparent conductor 16. In some implementations, the polarizer 40 may comprise a multilayer dielectric. Advantages to such an approach could include compactness of the system and/or reduced system-level complexity (e.g., reducing the need to align and clean additional free-space optics). This design that incorporates the polarizer 40 with the stack of elements that form the OALV device 10 may be used regardless of whether the semiconductor photoconductor 14, 52 is a UWBG semiconductor or not.

Possible High Power Applications

As discussed above, OALVs 10 can be used as a photomask to control the shape of laser beam output 50. In contrast to conventional liquid crystal based spatial light modulators (LC-SLMs), which generally include a two-dimensional array of discrete liquid crystal (LC) pixels, OALVs 10 may be based on a single twisted nematic LC cell formed by confining the LC 12 between a transparent optical window 24 and a photoconductor wafer 14. The addressing of OALVs 10 can be achieved by using an address beam image 32 of, for example, visible wavelength (e.g., ~470 nm wavelength), instead of applying a matrix of applied voltage into each cell as done in various LC-SLMs. The OALVs 10 can be operated by applying a voltage between two transparent conductors 16, 18, through the photoconductor 14 and liquid crystal 12, which are connected in series. The photoconductor 14 can be triggered by an incoherent sub-bandgap illumination to enable electron-photon interaction with deep level donors (such as vanadium in SiC). The consequent reduction in the resistivity results in the majority of the voltage being dropped in the LC layer 12, resulting in a shift in the liquid crystal orientation. By controlling the spatial map of the incoherent address beam, the electric field distribution across the LC layer 12 and polarization of the coherent beam 50 of the near infrared (NIR) beam (e.g., ~1053 nm or ~1064 nm) can be controlled. As described herein, OALVs 10 can thus be used to control the spatial intensity distribution of a laser beam 50 in real time.

Advantageously, in operation, the OALV 10 offers flexibility. As a result, the OALVs 10 can be used in high power and/or high intensity laser systems where the OALVs are employed to block the laser beams at specific damage sites that are deemed vulnerable to the extremely high laser fluence. This strategy enables an increase in the overall lifetime of the optics and a reduction in the interruption of operation. OALVs 10 may also be utilized in the field of additive manufacturing (AM) where OALVs can be used during the selective laser melting technique. OALV technology can also be employed during 3D metal printing from powder bed layers to reduce the fabrication time scale by at least 3×, with the potential to reach a ~200× reduction. Other applications are possible.

Thermal Control

As discussed above, the optical components in high power lasers and lasers systems can be exposed to high optical intensity and/or high optical power that can cause damage. Continuous wave (CW) lasers and laser systems may be particularly problematic, for example, in comparison to a pulsed system where heat may be dissipated during the time between pulses. Conversely, the continuous nature of a CW wave laser does not provide such opportunity for the optical components to cool and as a result thermal damage may occur.

Various designs are disclosed herein that may assist in managing the laser-heating induced temperature rise in an optically actuated light valve or OALV 10 exposed to high power laser beams such as in laser systems under continuous wave high power operation. The operational temperature of the OALV device in general should not exceed the capability limit of the constituent materials of the OALV system. As such, in various implementations described herein, an optically addressable light valve 10 is augmented with heat sinks and/or cooling systems to enhance the rate of heat dissipation, to be able to safely operate with high power lasers for extended periods of time. Other design features that increase the ability of the OALV 10 to operate when exposed to high power laser beams are also described. As a result, the OALVs 10 may be able to operate in both high fluence-short pulse applications and continuous wave-high power density operational environments where large amounts of thermal energy may be imparted onto the devices.

In various implementations, the OALVs 10 may employ a wide bandgap (WBG) or ultrawide bandgap (UWBG) photoconductor 14 having high thermal conductivity. Wide bandgaps may have bandgaps greater than 3.0 eV. Example materials may include silicon carbide (e.g., SiC, 6H/4H—SiC), gallium nitride (GaN), gallium oxide ($Ga_2O_3$), aluminum nitride (AlN), ternary alloys of AlN (e.g., with a bandgap of greater than 3.5 eV), aluminum gallium nitride (AlGaN), boron nitride (BN), diamond as well as various other materials described above. The bandgap of 6H-SiC is about 3.05 e V and may possibly be used. Other wide bandgap material such as 4H—SiC and GaN may also be used. Ultrawide bandgaps like $Ga_2O_3$ for example, which may have a bandgap of 4.8 eV, diamond which may have a bandgap of 5.5 eV, and AlN which may have a bandgap of 6.2 eV may be employed in various implementations. High thermal conductivity WBG/UWBG materials result in superior heat dissipation performance in these configurations. The use of wide/ultrawide band gap (WBG/UWBG) semiconductors as a high thermal conductivity photoconductor 14 for the OALVs 10 may provide a many fold increase in laser induced damage threshold (LIDT) for operations that involve high fluence laser pulses with short duration due potentially to the extremely high bond strengths and/or critical electric fields of these materials as compared to conventional OALV materials.

Use of additional thermal designs proposed herein enables the use with ~kW level laser systems that are switched on for long period of time (e.g., greater than the thermal time constant of the OALV 10) or are performing continuous wave operation. In such operational environments, the breakdown mode is likely dominated by thermal loads as opposed to dielectric breakdown mode, which may be prevalent in pulsed mode operation.

In various implementations, the substrate 24 for the OALV 10, which may potentially comprise glass as described above in connection with FIG. 1, or may comprise fused silica ($\kappa_{th}$=1.38 W/m-K), may alternatively comprise a higher thermal conductivity transparent substrate such as sapphire. Employing sapphire, for example, with a thermal conductivity, $\kappa_{th}$=35-42 W/m-K as the substrate 24, may potentially further increase the power handling capability of the OALV 10 significantly.

Other approaches for facilitating heat dissipation that may be used include one or more heat sinks. In various implementations, such heat sinks may be in thermal contact with one or more layers 14, 12, 24 or portions of the OALV 10.

FIGS. 5A-5C show, for example, an OALV 10 having first and second heat sinks 112a, 112b configured to remove heat from at least a portion of the OALV. In the example shown, two heat sinks 112a, 112b, are employed, however one or more heat sinks may be employed. In the example shown, the first heat sink 112a is more on a first side of the OALV layers (e.g., the photoconductor 14 and/or liquid crystal layer 12 and/or substrate 24) than the second heat sink 112b. Similarly, in the example shown, the second heat sink 112b is more on a second side of the OALV layers (e.g., the photoconductor 14 and/or liquid crystal layer 12 and/or substrate) than the first heat sink 112a. In the example shown, the heat sinks 112a, 112b are in the form of ring-shaped or tube-shaped (e.g., tubular) heat sinks having an open inner region 114. In particular, in this example, the first and second sinks 112a, 112b comprise a wall or sidewall 116 surrounding the inner open region 114. The ring-shaped or tubular heat sink 112a, 112b and wall 116 have a shape of a right circular cylinder, however, other tubular shapes are possible. In various instances, the ring-shaped or tubular heat sink 112a, 112b and wall 116 have a shape of a cylinder, however, the shapes should not be so limited.

FIG. 5A shows a laser beam 120 (represented by an arrow) incident on the OALV 10. The laser beam 120 may propagate through the open inner region 114 of the heat sink(s) 112a, 112b. In the example shown, the laser beam 112 propagates along the longitudinal direction (e.g., along the +Z direction) of the OALV 10 and/or heatsink(s) 112a, 112b. This longitudinal direction may be parallel to an optical axis 122 shown in FIG. 5B, for example, normal to the OALV 10 (e.g., normal to the layers 12, 14, 24 of the OALV). The laser beam 120 may comprise the input beam 34 of light to be acted on by the OALV 10, although the laser beam may also include the control beam 30. Similarly, although the laser beam 120 is shown incident on the OALV 10 from one direction (e.g., along the +Z direction) in other configurations, the laser beam may be incident on the OALV from the opposite direction (e.g., along the −Z direction). Likewise, in some implementations, light may be incident on the OALV 10 from opposite directions. For example, the input beam 34 may be incident on the OALV 10 from a first longitudinal direction (e.g., along +Z direction) and the control beam 30 may be incident on the OALV from a second longitudinal direction, for example, the opposite direction (e.g., along −Z direction). In some implementations, both beams 30, 34 are incident on the OALV 10 from the same direction (e.g., both along the +Z direction or both along the −Z direction).

In various implementations, the heat sink(s) 112a, 112b are on opposite sides of the light beam 120 directed onto the OALV 10 and/or the optical axis 122 through the OALV. In some cases, the heat sink 112a, 112b surrounds the light beam 120 directed onto the OALV 10 and/or the optical axis 122 through the OALV. In some cases, the heat sink 112a, 112b comprises a unitary component. In some cases, the heat sink 112a, 112b comprise a ring or ring-shaped or tubular heat sink. In some cases, the heat sink 112a, 112b comprises separate portions 118a, 118b, potentially with at least one portion on the opposite side of the optical axis 122 as the other portions. In some cases, the plurality of portions 118a, 118b surround the optical axis 122 and/or the laser beam 120 (e.g., the input optical beam 34 and/or the control beam 30).

In the examples shown in FIGS. 5A-5C, first and second heat sinks 112a, 112b are disposed on opposite sides of the photoconductor layer 14 and/or the liquid crystal layer 12 and/or the substrate 24 of the OALV 10 or at least more of the first heat sink is on a first side of the photoconductor layer 14 and/or the liquid crystal layer 12 and/or substrate 24 and more of the second heat sink is on a second side of the photoconductor layer 14 and/or the liquid crystal layer 12 and/or substrate 24.

Figure 8B:
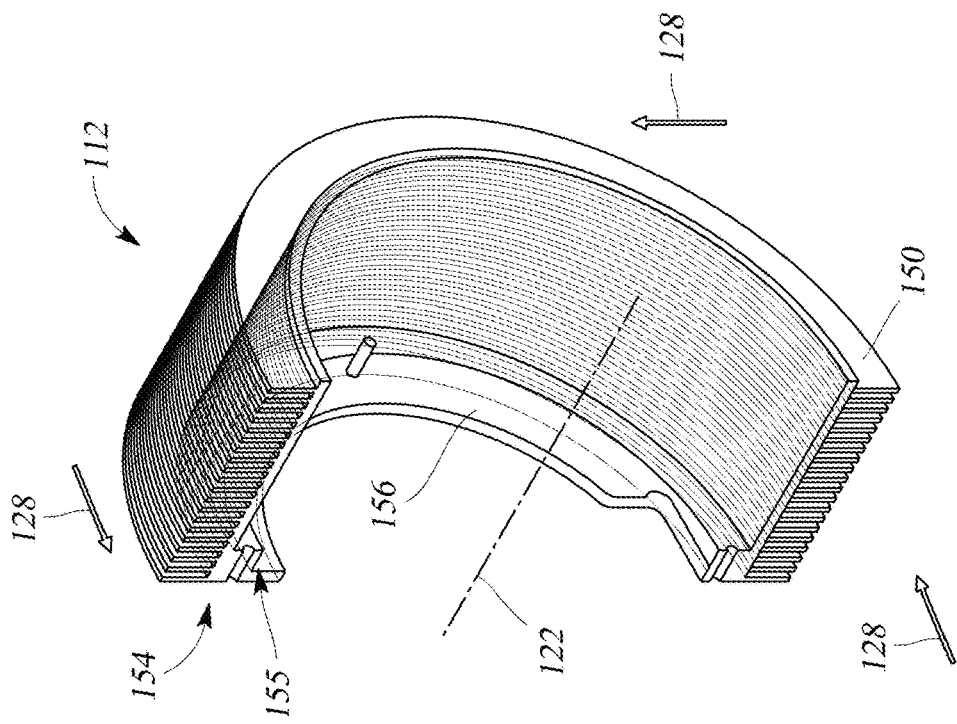
FIGS. 8A-8D illustrate a heat sink for the OALV wherein the heat sink comprises a plurality of radially directed fins, each fin extending azimuthally about the heat sink, wherein different fins are spaced apart from each at different positions longitudinally along the length of the heat sink.

In the example shown in FIGS. 5A-5B, the OALV 10 is in an optics mount, holder, frame or housing 124 having an open central region in which layers of the OALV, e.g., the photoconductor layer 14 and/or the liquid crystal layer 12 and/or substrate 24 of the OALV 10, are disposed. In the example shown, this optics mount, holder, frame or housing 124 comprises a ring, ring-shaped, or annular structure having the open central region therein. This optics mount, holder, frame or housing 124 may comprise thermally conductive material such as metal. In the implementation shown in FIGS. 5A-5C, this optics mount, holder, frame or housing 124 may be in thermal contact and/or physical contact with the first and/or second heat sink 112a, 112b. In various implementations, the mount will include a recess to fit the OALV 10 or at least part of one or more layers thereof 12, 14, 24, 16, 18 such as the periphery of the OALV or at least part of one or more layers thereof. In other implementations, the heat sink may include a recess 155 to hold or contain the OALV 10 or at least part of one or more layers thereof 12, 14, 24, 16, 18 such as the periphery of the OALV or at least part of one or more layers thereof such as shown in FIG. 8B. FIG. 8B also shows a support surface and/or contact surface 156 configured to support and/or contact (e.g., provide thermal contact to or with), one or more layers of the OALV 10 such as the photoconductor 14, liquid crystal 12, substrate or window 24, conductive layers 16 or conductive layer 18 or any combination thereof. As discussed above, the OALV 10 may be at least partially within a mount or holder for the OALV 10 or one or more layers thereof and likewise, such mount may include a recess 155 configured to hold or contain, and/or a surface and/or contact surface 156 such as shown in FIG. 8B configured to support and/or contact (e.g., provide thermal contact to or with), one or more layers of the OALV 10 such as the photoconductor 14, liquid crystal 12, substrate or window 24, conductive layers 16 or conductive layer 18, or any combination thereof.

Figure 8A:
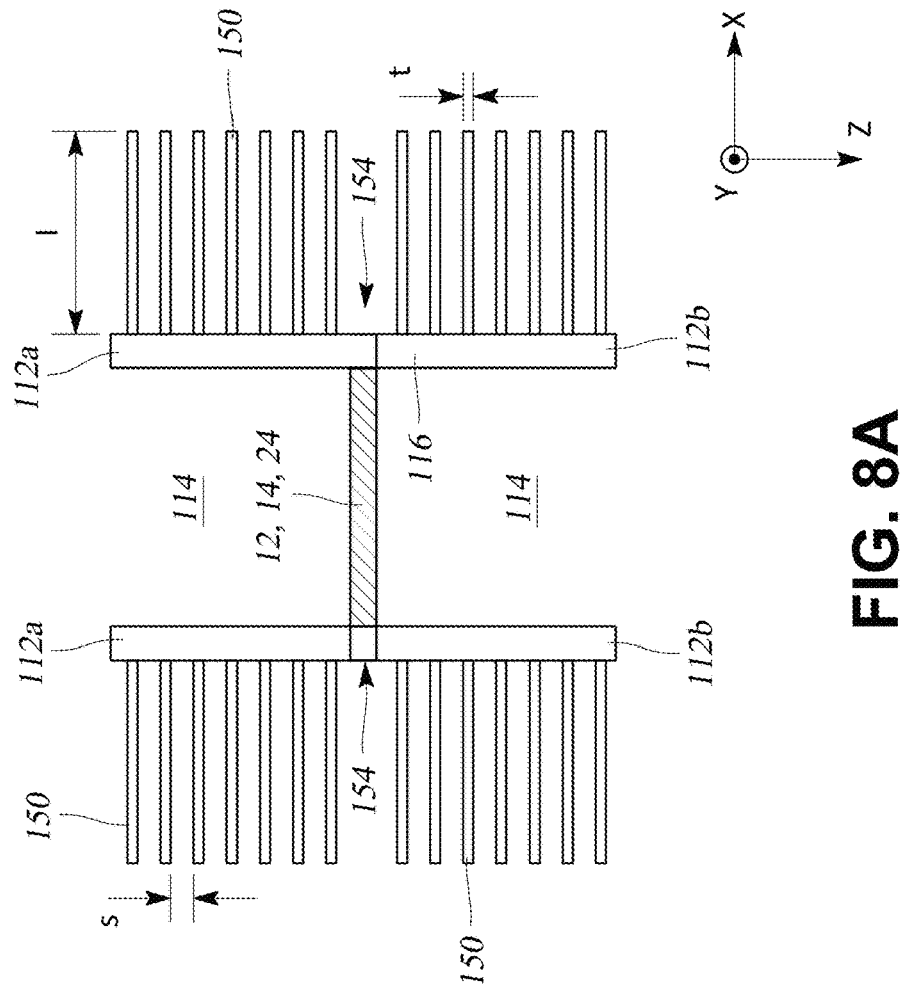

In various implementations, the heat sink 112a, 112b is disposed along the periphery of the photoconductor 14 or a portion thereof such as the top surface of the photoconductor (i.e., the surface normal to the beam path 120 propagating in the longitudinal direction, e.g., +Z direction) and/or of an electrode layer (e.g., ITO) thereon and/or the periphery of the optical window or substrate 24 or a portion thereof such as the bottom surface of the optical window (i.e., the surface normal to the beam path) and/or of an electrode layer (e.g., ITO) thereon. In some implementations, for example, one or both of the heat sinks 112a, 112b extend in the longitudinal direction (e.g., in the +Z direction and/or parallel to the optical axis 122) over the thickness or a portion thereof of one or more layers of the OALV 10, for example of the photoconductor 14, substrate 24, electrode(s), liquid crystal or any combination thereof. In some implementations, instead of having a separate optics mount, holder, frame or housing 124, one or both of the heat sinks 112a, 112b may comprise the optics mount, holder, frame, or housing (e.g., as shown in FIGS. 8A and 8D discussed below).

Likewise, in various implementations, one or more layers of the OALV 10, such as the photoconductor layer 14 and/or the liquid crystal layer 12 and/or the substrate 24 are within the open region 114 of the first and/or second heat sink 112a, 112b. The first and/or second heat sink 112a, 112b may thus comprise an optics mount, holder, frame or housing in some implementations. Similarly, the first and/or second heat sink 112a, 112b may comprise a sleeve or housing having an open inner region 114 in some implementations in which on or more layers of the OALV 10 (e.g., the photoconductor layer 14 and/or the liquid crystal layer 12 and or substrate or window 24) are disposed.

As discussed above and shown in FIGS. 8A-8D, the heat sinks 112a, 112b, for example, the side wall 116, are disposed at the periphery of the OALV 10 and/or layers (e.g., photoconductor 14, liquid crystal 12, substrate/window 24) comprising the OALV. Including the heat sinks 112a, 112b on the periphery of the OALV 10 and/or layers forming the OALV such as the photoconductor 14, liquid crystal 12, substrate 24, etc. decouples the path the optical beam 120 from the heat sink or other structure or configuration employed to provide cooling.

The heat sinks 112a, 112b described herein may comprise a thermally conductive material such as a potentially highly thermally conductive material. In some implementations, both the first and/or second heat sink 112a, 112b comprise the same material although they need not comprises the same material and can have similar or different size (e.g., length in the longitudinal direction) and/or shape. One suitable candidate material for the heat sink(s) 112a, 112b is copper. However, other high thermal conductivity materials can also be used.

To enhance cooling, air or gas may be directed to the OALV 10 and/or the heat sink(s) 112a, 112b. The gas may comprise, for example, gas optically transmissive or transparent to the input light beam 34 being acted on and/or the control beam 30. Thus, in various implementations, the gas may be optically transmissive or optically transparent to visible and/or infrared light (e.g., near infrared or NIR) although the light may comprise, and thus the gas may be transmissive or transparent to other wavelengths as well. FIG. 5B, for example, shows an air or gas cooling system 125 comprising source 126 of air or gas flow 128 provided with respect to the OALV 10 and/or the heat sink(s) 112a, 112b to provide cooling thereto. In this example, the source 126 of air or gas flow 128 comprises a fan. Additionally, in this example, the source 126 of air or gas flow 128 is provided lateral to the OALV 10 and/or the heat sink(s) 112a, 112b so as to provide air or gas directed to the OALV and/or the heat sink(s) from the lateral direction (e.g., the ±X and/or ±Y direction, orthogonal to the longitudinal (±Z) direction). Although one source 126 of air or gas flow 128 is shown, more than one may be employed. Similarly, the source or sources 126 of air or gas flow 128 can be located differently and may be directed toward the OALVs 10 and/or heat sink(s) 112a, 112b from different directions. For example, the laterally directed air or gas flow 128 may be directed into orthogonal directions (e.g., X and Y directions) to the direction of light propagation or to the optical axis (Z direction) 122 toward the OALVs and/or heat sink(s). When used in an environment with active forced convection, these heat sink(s) 112a, 112b offer orders of magnitude higher power handling capability, for example, for the OALVs 10 designed to operate under high fluences with short pulse widths.

In some implementations, a liquid cooling system 130 may be employed to cool the OALV 10 and/or the heat sink 112a. The liquid cooling system 130 may comprise, for example, a liquid cooling heat exchanger 132 comprising one or more conduits or channels 132 through which liquid flows. This liquid may comprise water or other liquid coolant. The conduit or channel 132 may be proximal to and/or in contact with or in thermal contact with the heatsink 112a, for example, the sidewall 116 of the heat sink in this configuration. Likewise, the conduit or channel 132 may be proximal to and/or in contact with or thermal contact with a mount, holder, frame or housing 124 for the OALV 10 or layers thereof. Similarly, the conduit or channel 132 may be proximal to and or in contact with or in thermal contact with OALV 10 or layers thereof such as at a periphery 132 of OALV 10 or the layers thereof such as the photoconductor 14, liquid crystal 12, substrate 24, conductive layer 16 or conductive layer 18 or any combination. The periphery 136 of the OALV 10 or layer(s) thereof are cooled and may as a result be cooler than a center or central region 134 of the OALV and the layer(s) thereof. Reducing the temperature at the periphery 136, however, will likely cause the central region 134 to have a lower temperature than without the cooling of the periphery. Although a single pipe or conduit 132 is shown in the example liquid cooling system 130 depicted in FIG. 6C, more than a single conduit or channel may be employed. Additionally, the piping, conduit(s), and/or channel(s) 132 may be coiled in some implementations. Liquid cooling systems 130 can be more effective in managing thermal load than air or gas cooling. Hence, for configurations that are more demanding than the capability of the air or gas cooling systems 125, liquid cooling configurations 130 may potentially be used.

In various implementations, the heat sink 112a may have airflow vents 138 to enhance air circulation such as shown in FIGS. 6A-6C. These vents 138 comprise openings in the wall 116 of the heat sink 112a that may provide access to the open inner region 114 of the heat sink. In various configurations, these vents 138 are disposed proximal to the layers of the OALV 10 such as to the photoconductor 14, liquid crystal 12 and/or the substrate 24 or electrode layers (e.g., transparent electrode layers such as ITO on the photoconductor or substrate). As such, air or gas may flow across a surface 140 of the OALV 10 such as an outward (e.g., upper, front, or lower, back) surface of the OALV 10 such as shown in FIG. 6C. This surface 140 may, for example, comprises a surface of the photoconductor 12 and/or substrate or window 24 or a conductive layer or electrode layer 18, 16 on the photoconductor or substrate or window in some designs. In some implementations, the vents 138 are closer to the photoconductor 14 than the liquid crystal or to the substrate or window 24. In other implementations, the vents 138 are closer to the substrate or window 24 than to the liquid crystal 12 or photoconductor 14. In some implementations, however, one or more vents 138 are included on opposite sides of the OALV 10 or one or more layers thereof such as the photoconductor 14, the liquid crystal 12, the substrate/window 24 or any combination thereof.

In the example shown in FIGS. 6A and 6C, a source 126 of air or gas flow 128 provides air or gas that may flow through the vents 138 to cool the OALV 10 and/or layers thereof such as the photoconductor 14, liquid crystal 12, substrate/window 24 or any combination thereof. For example, fans or other sources 126 of air or gas 128 blow air or gas laterally (e.g., in the ±X or ±Y direction) to the OALV 10 (e.g., in a normal direction to the beam path or ±Z direction). This air or gas 128 may flow into the vents 138 to enable the air or gas to wash the OALV surface 140 and enhance heat dissipation.

As discussed above, the vents 138 may comprise openings in the wall 116 of the heat sink 112a, 112b. The vents 138 may be formed by an end (e.g., base) 142 of the sidewall 116 comprising an edge 146, 148 that varies in longitudinal extend to form the vents. As shown in FIGS. 6A-6C the end 142 of the sidewall 116 may include distal edges 146 separated by proximal edges 148. The distal edges 146 extend farther distally than the proximal edges 148 so as to form open regions (e.g., slits or slots) 138 between adjacent distal edges. Other configurations are possible.

Figures 7A, 7B:
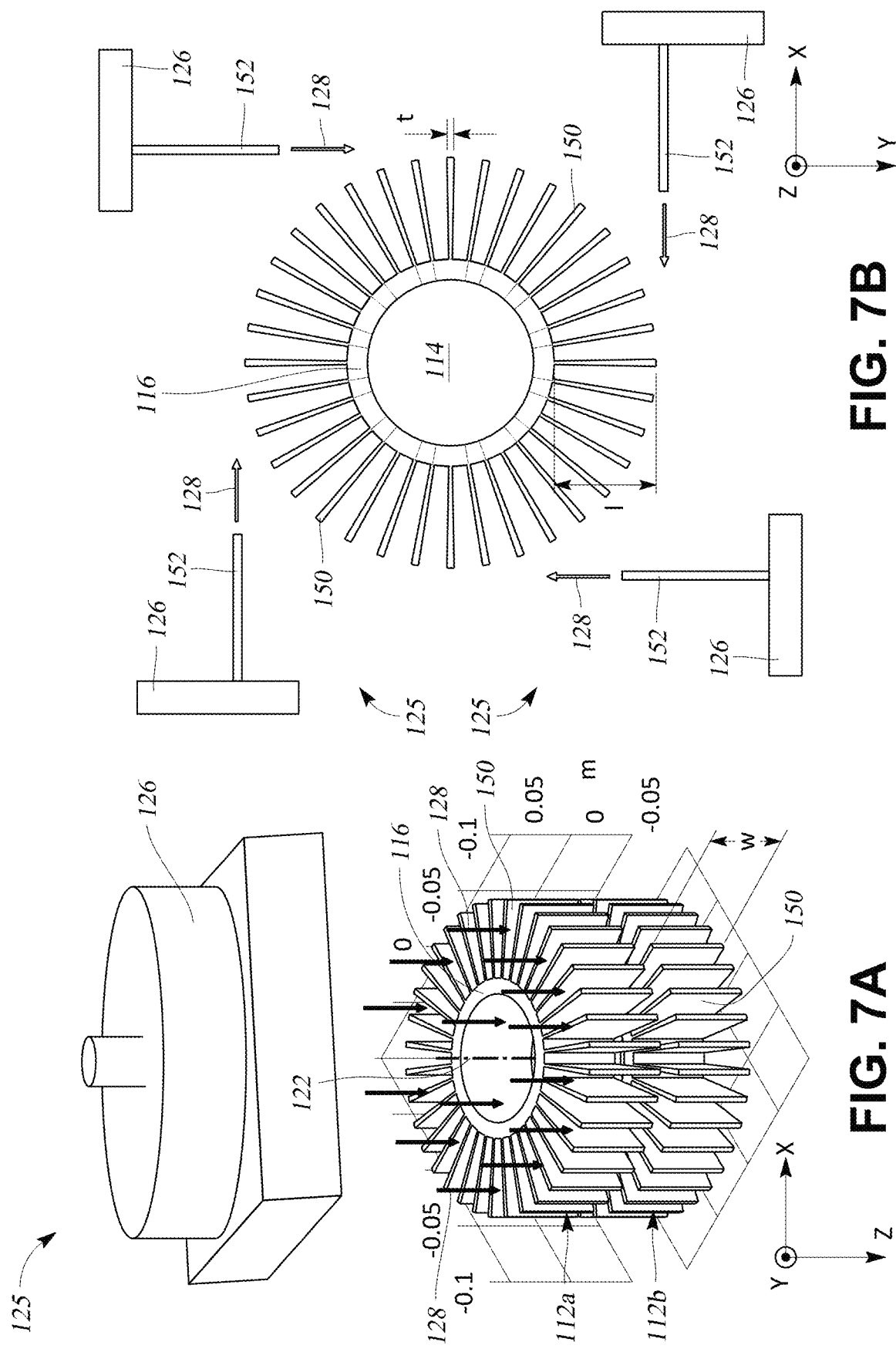
FIGS. 7A and 7B are perspective and top views of a heat sink for the OALV wherein the heat sink comprises a plurality of radially directed fins arranged azimuthally about the heat sink.

In various implementations, the heat sink 112a, 112b comprises fins 150 such as shown in FIGS. 7A and 7B. FIG. 7A shows a perspective view of the heat sinks 112a, 112b and FIG. 7B shows a cross-sectional view of a heat sink having such radially extending radiative fins 150. Such fins 150 may assist in radiating heat from the heat sink 112a, 112b thereby facilitating cooling. The fins 150 shown in the example depicted in FIGS. 7A and 7B comprise radial fins extending radially from the sidewall 116 of the heat sink 112a, 112b. Likewise, the fins 150 extend in a direction orthogonal to the optical axis 122 and away from the sidewall 116. Accordingly, the fins 150 may comprise a plurality of sheets having a width, w, extending in the longitudinal direction through the layers (e.g., photoconductor 14, liquid crystal 12, and/or substrate or window 24) of the OALV 10 and/or the optical axis 122 therethrough. The sheets 150 are spaced apart from each other in an array extending azimuthally about at least a portion of the optically addressable light valve 10, one or more of the layers thereof, the optical axis 122 therethrough, the sidewall 116 of the heatsink 112a, 112b or any combination of these. The number of fins 150 on the heat sink 112a, 112b may be 2, 3, 4, 5, 6, 8, 10, 12, 15, 20, 25, 30, 35, 40, 45, 50 or may be a number in any range formed by any of these values or possibly more or less in number. The fins 150 may comprise thermally conducting material such as copper although other thermally conducting materials (e.g., metals) or other materials may be employed. The fins 150 can have shapes and/or fin spacing, s, different from that shown in FIGS. 7A and 7B in some implementations. The shape (e.g., length, l and width, w) and/or spacing, s, of the fins 150 may for example be configured to increase the cooling performance. Incorporating radial fins 150 arranged along the periphery of the OALV 10 and, in particular, in thermal contact with one or more layers 14, 12, 24 of the OALV may increase heat dissipation therefrom.

FIG. 7A also shows an air or gas cooling system 125 comprising a source 126 of air or gas flow 128 configured to direct air or gas along the longitudinal or axial direction (e.g., along the Z direction) onto the OALV 10 and/or the heat sink(s) 112a, 112b to provide cooling thereto. The source 126 of air or gas flow 128 may comprise, for example, one or more fans. In the example shown, the fan 126 is depicted within a manifold or duct although such a design is not required. One or more axial fans 126 may enhance the convective heat transfer from the OALV surface. Using fans 126 can, for example, increase the heat transfer coefficient from the OALV surface by 2×-4×, e.g., 3×, assuming a fan velocity of, for example, 5-15 m/s, e.g., 10 m/s at the surface. Such an increase in the heat transfer or heat transfer coefficient can be achieved with one stream of air flow flowing laterally or longitudinally over the surface of the OALV 10.

FIG. 7B shows an air or gas cooling system 125 comprising a source 126 of compressed air or gas 128 provided to direct compressed air or gas azimuthally about the OALV 10 and heat sink(s) 112a, 112b to provide cooling thereto. The source 126 of air or gas flow 128 may include, for example, nozzles 152 placed about the OALV 10 and heat sink(s) 112a, 112b directed, e.g., tangentially with respect to the heat sinks. In other designs, the source 126 of air or gas may comprise one or more centrifugal fans configured to direct air or gas azimuthally about the OALV 10 and/or heat sink(s) 112a, 112b. In various implementations, one or more enclosures, manifolds or ducts can be used to direct the air or gas flow 128, for example, to hug the cylindrical shape of the heat sinks 112a, 112b, and/or optics. In some designs, the source 126 of air or gas flow 128 may comprise one or more axial fans and one or more centrifugal fans, for example, to obtain the desired level of cooling. Similarly, compressed air or gas 128 from sources 126 of compressed air or gas may be directed axially and centrifugally.

In some designs, an air or gas cooling system 125 comprising a compressed air or gas delivery system comprising channels (e.g., conduits, manifolds, nozzles, etc.) 152 for passage and ejection of compressed air or gas across the surface 140 of the OALV 10 exposed to light 120 and/or one or more layers of the OALV such as the photoconductor layer 14 or substrate/window 24 or conductive layers thereon 18, 16 may be employed to cool the OALV, with or without heat sinks 112a, 112b, or fins 150. The photoconductor layer 14 and/or substrate/window 24 may have a layer or coating thereon such as an electrode layer (e.g., ITO) 18, 16 and the compressed air or gas 128 may contact such an exposed layer. Likewise, such compressed air or gas delivery systems 125 may have channels (e.g., conduits, manifolds, nozzles, etc.) 152 with openings or outlets disposed with respect to such surfaces 140 of the OALV 10 and layers thereof to provide compressed air or gas flow 128 thereto and/or thereacross. Such a compressed air or gas delivery system 125 that shoots high pressure high velocity compressed air or gas 128 to wash over the OALV surface 140 may advantageously be compact and effective at reducing temperatures of the OALV 10 and/or layers thereof. In various implementations, the compressed air delivery system 125 may include channels (e.g., conduits, manifolds, nozzles) 152 disposed to eject high velocity air through the openings over the OALV surface 140. The angles at which the air or gas is directed and/or the angle at which the channel (e.g., nozzle) 152 or channel opening is directed, the size of the opening (e.g., slot size) of the channel, the compressed air velocity, the impingement distance of the channel opening to the OALV surface 140, or any combinations of these can be parameters that vary depending on design. In some implementations such as shown in FIG. 8D discussed below, the channels (e.g., conduits, manifolds, nozzles) 152 are disposed with respect to vents or openings 138 (slits, slot, or openings) in the heat sink 112a, 112b to provide access to the OALV surface(s) and/or layers (e.g., photoconductor 12, substrate/window 24, transparent conductor 18, electrode layers 16, 18, etc.). As discussed above, the gases may optically transparent or transmissive to the wavelengths of the light beam(s) 120 such as the input beam 34 or control beam 30 and thus may, for example, be optically transparent or transmissive to visible or infrared (near IR) light although other types (e.g., wavelength) light, may be employed and the gas may be optically transmissive or transparent to such wavelength light.

Figure 8C:
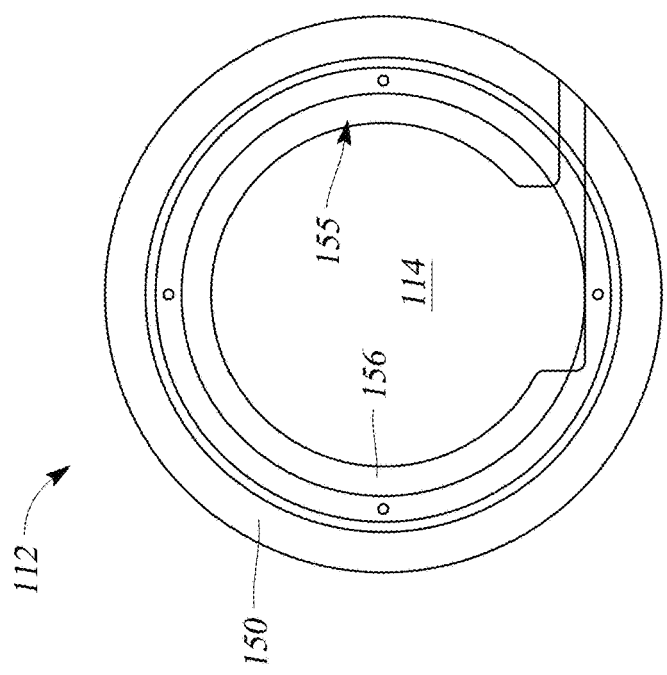
Figure 8D:
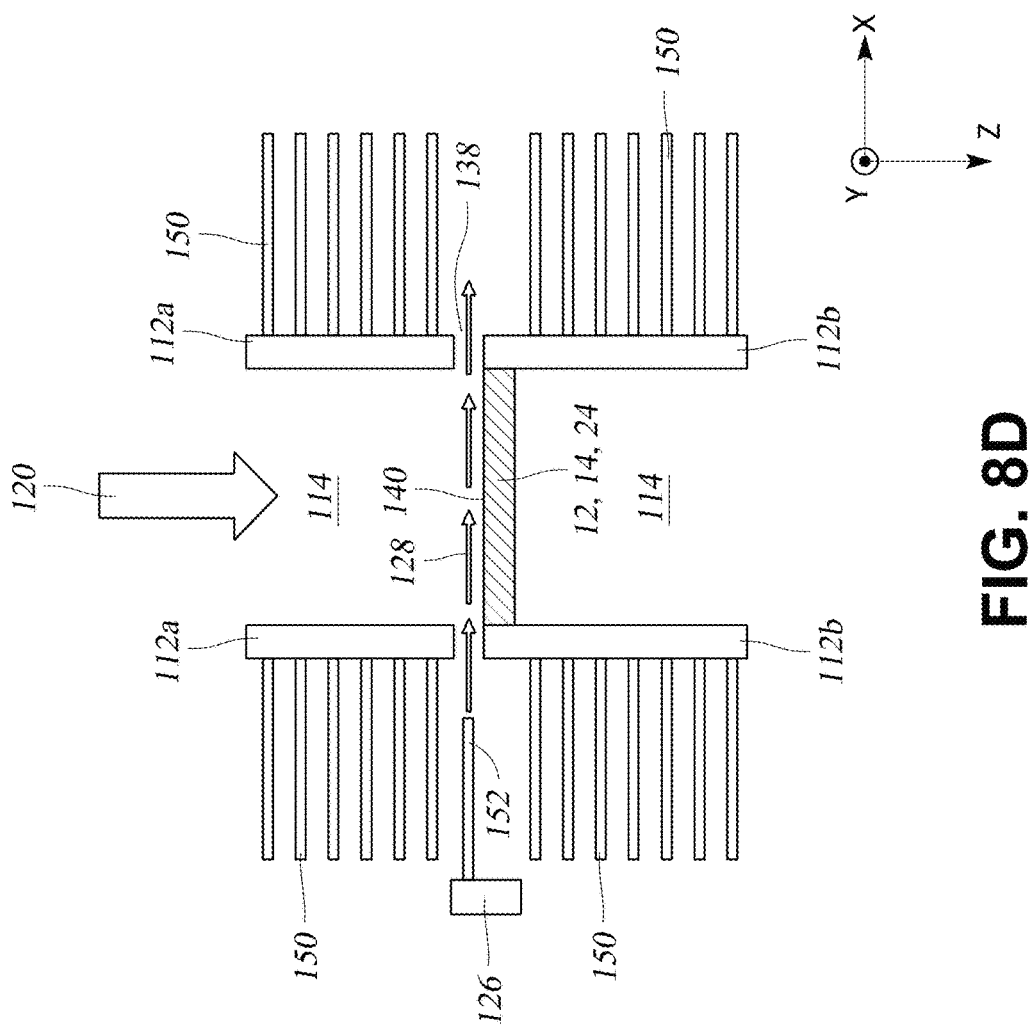

FIGS. 8A-8D show heatsinks 112a, 112b, with radial fins 150 having a different configuration. FIG. 8A shows a cross-sectional view of the heat sinks 112a, 112b and fins 150, FIG. 8B shows a cut away perspective view of the heat sinks and fins, and FIG. 8C shows a top view of heat sink. In particular, the fins 150 comprise a plurality of sheets having a width, w, extending azimuthally about at least a portion of optically addressable light valve 10 and a length, l, extending radially from the optically addressable light valve. The fins/sheets 150 have a thickness, t, extending in the longitudinal direction (+Z direction). For this design, the radiative fins 150 thus comprise annular shaped or ring-shaped fins. Additionally, the fins or sheets 150 are spaced apart from each other in an array extending in the longitudinal direction (+Z direction). A spacing, s, is shown between adjacent fins 150.

In the design shown in FIG. 8A, the first heat sink 112a is a holder or mount for layers (e.g., the photoconductor 14, liquid crystal 12, and substrate/window 24) of the OALV 10. In particular, these layers 12, 14, 24 are held by a distal region 154 of the sidewalls 116 of the first heat sink 112a in the example design illustrated in FIG. 8A. Variations are possible. For example, although a fin 150 is not shown in this distal region 154 where the layers 12, 14, 24 of the OALV 10 are located, in other designs, one or more fins may be included in this region. Additionally, in other designs, the second heat sink 112b is a holder or mount for layers (e.g., the photoconductor 14, liquid crystal 12, and substrate/window 24) of the OALV 10. Likewise, in some designs, the first or second heat sink 112a, 112b is a mount or holder for one or more, but not all of the layers (e.g., the photoconductor 14, liquid crystal 12, and substrate/window 24).

FIG. 8B shows recess 155 configured to hold or contain, and a support surface 156 configured to support, one or more layers of the OALV 10 such as the photoconductor 14, liquid crystal 12, substrate or window 24 or any combination thereof. As discussed above, the heat sink 112a may comprise a mount or holder for the OALV 10 or one or more layers thereof.

FIG. 8B additionally shows air or gas 128 flowing centrifugally or azimuthally about the heat sink 112a. In some cases, the flow 128 is centered about the optical axis 122 but need not be so. Such air or gas 128 may comprise air or gas from a fan 126 or compressed air or gas from a compressed air or gas source. In some designs, one or more enclosures, manifolds or ducts may be included to facilitate, for example, guiding of the air or gas flow 128 about and/or around the heat sink 112a.

FIG. 8C shows the heat sink 112a and the annular or ring-shaped fin 150. As illustrated, the width, w, of the fin 150 extends 360° about the heat sink 112a, for example, about the optical axis 122 of the OALV 10. FIG. 8C additionally shows recess 155 configured to contain, and the support and/or contact surface 156 configured to support and/or contact, one or more layers of the OALV 10 such as the photoconductor 14, liquid crystal 12, substrate or window 24 or first or second conductive layer 16, 18 or any combination thereof. As discussed above, the heat sink 112a may comprise a mount or holder for the OALV 10 or one or more layers thereof.

As discussed above, the OALV 10 can be equipped with one or more heat sinks 112a, 112b. Air or gas cooling systems 125 and/or liquid cooling systems 130 may also be used to cool the OALV 10. Such air or gas cooling systems 125 and/or liquid cooling systems 130 may be used in conjunction with one or more heat sinks 112a, 112b although the heat sink(s) are not required. In general, any of the features described herein may be combined with any other features described herein to facilitate cooling. For example, vents 138 in the heat sink(s) 112a, 112b may be included together with a compressed air or gas system 125. FIG. 8D, for example, shows a channels (e.g., conduits, manifolds, nozzles) 152 disposed with respect to vents or openings 138 (slits, slot, or openings) in the heat sink 112a, 112b to provide access to the OALV surface(s) 140 and/or one or more layers (e.g., one or more of the photoconductor 12, substrate/window 24, transparent conductive layers 16, 18 etc.). Similarly, as discussed above, a higher thermal conductivity transparent substrate 24 (e.g., sapphire) can be employed in conjunction with a variety of possible fin arrangements to increase heat dissipation effectiveness. Similarly, as discussed above, the use of WBG and UWBG materials as a photoconductor 14 can provide the additional advantage to various designs which may or may not include one or more heat sinks 112a, 112b and/or a liquid or air or gas cooling systems 130, 125. For example, potential designs include the implementation of compressed air impingement over the OALV 10 using millimeter scale slots as vents 138 and liquid coolant over, across, or proximal the heat sink 112a. Such configurations for providing enhanced cooling can enable higher intensity laser beams incident on the OALV 10.

Further improvement in power handling capability is possible with modified architectures such as reflective designs such as shown in FIG. 4. In various implementations of such reflective designs, the input light beam 34 being acted on may reflect back when it is incident on the mirror or reflector 54. Thus, one side of the OALV 10 can be de-coupled from the beam path of the input beam 34. Heat sinks, possibly including fins, and/or cooling systems 125, 130 possibly comprising liquid cooling pipes, tubes or conduits, compressed air or gas flow channels and/or nozzles, etc. can be placed directly on or proximal to this surface of the OALV 10 such as the surface of the photoconductor or electrically conductive layer 18, thereby enabling highly effected extraction of heat, as well as potentially providing uniform temperature distribution across the surface. Such heat sinks 112, 112a need not be tubular. In some such implementations, both the input and control beams 34, 30 can come from the same side (e.g., the liquid crystal side of the mirror or reflector 52 such that these beams both pass through the liquid crystal 12 prior to being incident on the mirror or reflector). When the address beam 30 is on, the photoconductor 14 is activated. The liquid crystal 12 lets the input beam 34 pass through such that the input beam reflects from the mirror/reflector 54. Consequently, the input beam 34 or most of it does not reach the photoconductor 14, 52 in some such designs. In contrast, the address beam 30 is generally transmitted through the photoconductor 14, 52. (A certain fraction of the address beam 30 is absorbed in the photoconductor 14, 52.) The address beam 30 is then incident on the heat sink 112, 112a and/or cooling system 125, 130 on the other side of the photoconductor 14, 52. In some implementations, the heat sink 112, 112a and/or cooling system can absorb most if not all the remainder of the address beam 30. Heat from the input beam 34 can dissipate through the mirror 54 and the photoconductor 14, 52, into the heat sink 112, 112a and/or cooling system on the other side of the photoconductor as the liquid crystal 12. As a majority of the input beam 34 is not absorbed in this system, the heating itself may also be less compared to the transmissive design.

As discussed above, in such a configuration, the heat sink 112, 112a and/or cooling system 125, 130 may be on the side of the photoconductor 14, 52 opposite the liquid crystal 12. The heat sink 112, 112a and/or cooling system 125, 130 may, for example, be on or over the transparent conductive layer 18 and/or the photoconductor 14, 52. In the example above, both the input beam 34 and the address beam 30 are incident on the OALV 10 and/or layers thereof (e.g., liquid crystal 12, mirror/reflector 54) from the same side, for example, from the side of the liquid crystal opposite the photoconductor 14, 52. The heat sink 112, 112a and/or cooling system 125, 130 need not be a tubular design (e.g., such as a design shown in FIGS. 5-8) having an open inner region 114 for passing a beam of light such as the input beam 34 and/or the address beam 30, however, tubular designs (e.g., such as a design shown in FIGS. 5-8) having such open inner region 114 for passage of a light beam may possible be employed.

In one example, the input light beam 34 and the address beam 30 come from different sides. For example, the input light beam 34 to be acted on may be incident on the OALV 10 from the side of the liquid crystal 12 and the address beam 30 can be incident from the side of the photoconductor 14, 52. In some such configurations, a heat sink 112, 112a and/or cooling system 125, 130 having a tubular design (e.g., such as a design shown in FIGS. 5-8) and/or having an open inner region 114 for light to pass through may be employed. For example, such a heat sink 112, 112a and/or cooling system 125, 130 may be on the photoconductor side of the OALV 10, on the opposite side of the photoconductor 14, 52 as the liquid crystal layer 12. The heat sink 112, 112a and/or cooling system 125, 130 may have a tubular design with an open inner region 114 for one of the beams such as the address beam 30. The input beam 34 to be acted on may come from the opposite side of the OALV 10 possibly being reflected off the reflector/mirror 54. Other configurations that may or may not employ any of the heat sinks 112, 112a, 112b and/or cooling systems 125, 130 described herein may be employed. Likewise, in some implementations, the mirror or reflector 52 reflects both the input beam 34 and the address beam 30 while in other implementations the mirror or reflector is configured to primarily reflect the one of the beams and primarily transmits the other beam. For example, in some implementations the mirror or reflector 52 is configured to primarily reflects the input beam 34 and primarily transmits the address beam 30. In other implementations, the mirror or reflector 52 is configured to primarily reflects the address beam 30 and primarily transmits the input beam 34.

In still other configurations, both the input beams 34 and the address beam 30 come from the same side of the OALV 10, e.g., the photoconductor side of the OALV or on the side of the photoconductor 14 opposite the liquid crystal 12 and are transmitted through the OALV. Such designed may not include a mirror/reflector 52 and may be similar to designs shown in FIGS. 2 and 3, for example. Alternatively, the beams 34, 30 can come from the other side of the OALV 10 such as the liquid crystal side of the OALV or on the side of the photoconductor 14 having the liquid crystal 12.

Still other designs and configurations with and/or without heatsinks 112 and/or cooling systems 125, 130, with and/or without mirrors/reflectors 52, using or not using UWBG photoconductors may be employed. A wide range of different materials and components may be employed. For example, indium tin oxide (ITO) may be employed as an optically transparent conductor, however, other materials optically transparent to the light beam or beams that are to be transmitted therethrough may be employed. In some cases, one or more of the beams may be visible or infrared light beam (e.g., near IR) or combinations thereof. However, the wavelengths need not be so limited. Light or beams having other wavelengths or in other wavelength ranges may be employed. Still other configurations and designs are possible.

As discussed above, various methods and configurations may be employed to cool OALV 10. Such designs may enable continuous wave (CW) laser operation and have potential applications in the field of additive manufacturing. Furthermore, any of the systems, components, features, and methods described herein in connection OALVs 10 can alternatively or additionally be used with or for (e.g., to cool) other optical elements or components such as optical switches (e.g., photoconductive switches), optically gated transistors or other suitable optical elements that may be operating at high power density conditions.

Accordingly, a wide variety of variations in the OALV device or system designs including cooling systems 125, 130 and configurations as well as methods of use are possible. As discussed above, any of the features described herein can be combined with any other features described herein. Other variations are possible.

EXAMPLES

This disclosure provides various examples of devices, systems, and methods. Some such examples include but are not limited to the following examples.

Part I:
1. An optically addressable light valve configured to spatially modulate the intensity of an input beam of light, the optically addressable light valve comprising:
    a first transparent conductor layer;
    a layer of liquid crystal; and
    a photoconductor comprising a semiconductor having a bandgap of at least 3.5 eV, said liquid crystal between said first transparent conductor layer and said semiconductor photoconductor,
    wherein said optically addressable light valve is configured to apply a voltage across said liquid crystal and said semiconductor photoconductor.
2. The optically addressable light valve of Example 1, wherein said semiconductor photoconductor has a bandgap of at least 4.0 eV.
3. The optically addressable light valve of any of the examples above, wherein said semiconductor photoconductor has a bandgap of at least 4.5 eV.
4. The optically addressable light valve of any of the examples above, wherein said semiconductor photoconductor comprises an ultra-wide bandgap semiconductor.
5. The optically addressable light valve of any of the examples above, wherein said semiconductor photoconductor comprises one or more of $Ga_2O_3$, AlN, BN, diamond, $Al_xGa_{(2-x)}O_3$ where $0 \leq x \leq 2$, or spinel gallates and aluminates such as: $ZnGa_2O_4$, $MgGa_2O_4$, $ZnAl_2O_4$, and $MgAl_2O_4$.
6. The optically addressable light valve of any of the examples above, wherein said semiconductor photoconductor includes deep level color centers or dopants such that the semiconductor photoconductor generates photocarriers in response to receiving visible light.
7. The optically addressable light valve of Example 6, wherein said semiconductor photoconductor comprises diamond and said deep level color centers or dopants comprise P or N, wherein said semiconductor photoconductor comprises $Ga_2O_3$ and said deep level color centers or dopants comprise Sn, Fe or Mg, or wherein said semiconductor photoconductor comprises AlN and said deep level color centers or dopants comprise O or Mg.
8. The optically addressable light valve of any of the examples above, further comprising a second transparent conductor layer, said liquid crystal and said semiconductor photoconductor between said first and second transparent conductor layers, said optically addressable light valve being configured to apply a voltage between said first and second conductor layers.
9. The optically addressable light valve of any of Examples 1-7, wherein a second transparent conductor layer is formed in said semiconductor photoconductor on one side such that said second transparent conductor layer and said semiconductor photoconductor comprise a single monolithic structure.
10. The optically addressable light valve of claim 8, wherein said second transparent conductor layer comprises $Ga_2O_3$, AlN, BN, or diamond.
11. The optically addressable light valve of any of the Examples 1-7 and 9-10, wherein said semiconductor photoconductor includes a sufficiently high amount of impurity dopants on a side of said semiconductor opposite said liquid crystal to form a second conductive layer, said second conductive layer disposed in said semiconductor photoconductor.
12. The optically addressable light valve of any of Examples 1-7 and 9-11, wherein said semiconductor photoconductor includes at least one layer of material to form a two-dimensional electron or hole gas on a side of said semiconductor photoconductor opposite said liquid crystal, said two-dimensional electron or hole gas disposed in said semiconductor photoconductor.

13. The optically addressable light valve of Example 12, wherein said at least one layer of material configured to form a two-dimensional electron or hole gas comprises a layer of aluminum nitride (AlN) or layer of gallium nitride (GaN) or a combination of layers of AlN and GaN.

14. The optically addressable light valve of Example 12, wherein said semiconductor photoconductor comprises $Ga_2O_3$ and said at least one layer of material configured to form a two-dimensional electron or hole gas comprises a layer of aluminum gallium oxide (AlGaO) thereby forming a two-dimensional electron gas at the interface of the $Ga_2O_3$ and the AlGaO.

15. An optically addressable light valve configured to spatially modulate the intensity of an input beam of light, said optically addressable light valve comprising:
    a first transparent conductor layer;
    a layer of liquid crystal; and
    a photoconductor comprising an ultra-wide band gap semiconductor, said liquid crystal between said first transparent conductor layer and said ultra-wide bandgap semiconductor,
    wherein said optically addressable light valve is configured to apply a voltage across said liquid crystal and said ultra-wide bandgap semiconductor photoconductor.

16. The optically addressable light valve of Example 15, wherein said semiconductor photoconductor has a bandgap of at least 4.5 eV.

17. The optically addressable light valve of any of Examples 15 or 16, wherein said semiconductor photoconductor comprises one or more of $Ga_2O_3$, AlN, BN, diamond, $Al_xGa_{(2-x)}O_3$ where $0 \le x \le 2$, or spinel gallates and aluminates such as: $ZnGa_2O_4$, $MgGa_2O_4$, $ZnAl_2O_4$, and $MgAl_2O_4$.

18. The optically addressable light valve of any of Examples 15-17, wherein said semiconductor photoconductor includes deep level color centers or dopants such that the semiconductor photoconductor generates photocarriers in response to receiving visible light.

19. The optically addressable light valve of Example 18, wherein said semiconductor photoconductor comprises diamond and said deep level color centers or dopants comprise P or N, wherein said semiconductor photoconductor comprises $Ga_2O_3$ and said deep level color centers or dopants comprise Sn, Fe or Mg, or wherein said semiconductor photoconductor comprises AlN and said deep level color centers or dopants comprise O or Mg.

20. The optically addressable light valve of any of Examples 15-19, further comprising a second transparent conductor layer, said liquid crystal and said semiconductor photoconductor between said first and second transparent conductor layers, said optically addressable light valve being configured to apply a voltage between said first and second conductor layers.

21. The optically addressable light valve of any of Examples 15-19, wherein a second transparent conductor layer is formed in said semiconductor photoconductor on one side such that said second transparent conductor layer and said semiconductor photoconductor comprise a single monolithic structure.

22. The optically addressable light valve of any of Examples 15-19 and 21, wherein a second transparent conductor layer comprises one or more of $Ga_2O_3$, AlN, BN, diamond, $Al_xGa_{(2-x)}O_3$ where $0 \le x \le 2$, or spinel gallates and aluminates such as: $ZnGa_2O_4$, $MgGa_2O_4$, $ZnAl_2O_4$, and $MgAl_2O_4$.

23. The optically addressable light valve of any of Examples 15-19 and 22, wherein said semiconductor photoconductor includes a sufficiently high amount of impurity dopants on a side of said ultra-wide bandgap semiconductor opposite said liquid crystal to form a second conductive layer, said second conductive layer disposed in said semiconductor photoconductor.

24. The optically addressable light valve of any of Examples 15-19 and 23, wherein said semiconductor photoconductor includes at least one layer of material to form a two-dimensional electron or hole gas on a side of said semiconductor photoconductor opposite said liquid crystal, said two-dimensional electron or hole gas disposed in said semiconductor photoconductor.

25. The optically addressable light valve of Example 24, wherein said at least one layer of material configured to form a two-dimensional electron or hole gas comprises a layer of aluminum nitride (AlN) or layer of gallium nitride (GaN) or a combination of layers of AlN and GaN.

26. The optically addressable light valve of Example 24, wherein said semiconductor photoconductor comprises $Ga_2O_3$ and said at least one layer of material configured to form a two-dimensional electron or hole gas comprises a layer of aluminum gallium oxide (AlGaO) thereby forming a two-dimensional electron gas at the interface of the $Ga_2O_3$ and the AlGaO.

Part II:
1. An optically addressable light valve configured to spatially modulate the intensity of an input beam of light, said optically addressable light valve comprising:
    a first transparent conductor layer;
    a layer of liquid crystal; and
    a semiconductor photoconductor, said layer of liquid crystal between said first transparent conductor layer and said semiconductor photoconductor, said semiconductor photoconductor including impurity dopants on a side of said semiconductor photoconductor opposite said layer of liquid crystal to form a second conductor layer, said second conductor layer disposed in said semiconductor photoconductor,
    wherein said optically addressable light valve is configured to apply a voltage across said liquid crystal and said semiconductor photoconductor.

2. The optically addressable light valve of Example 1, the voltage may be applied across the first and second transparent conductor.

3. An optically addressable light valve configured to spatially modulate the intensity of an input beam of light, said optically addressable light valve comprising:
    a first transparent conductor layer;
    a layer of liquid crystal; and
    a semiconductor photoconductor, said layer of liquid crystal between said first transparent conductor layer and said semiconductor photoconductor, said semiconductor photoconductor including a second conductor layer formed in said semiconductor photoconductor to provide a single monolithic structure comprising said second conductor layer and said semiconductor photoconductor,
    wherein said optically addressable light valve is configured to apply a voltage across said liquid crystal and said semiconductor photoconductor.

4. The optically addressable light valve of Example 3, the voltage may be applied across the first and second transparent conductor.
5. The optically addressable light valve of Examples 1-4, wherein said semiconductor photoconductor comprises SiC.
6. The optically addressable light valve of Examples 1-5, wherein said semiconductor photoconductor comprises N—SiC thereon or on one side to provide said second conductor layer.

Part III:
1. An optically addressable light valve configured to spatially modulate the intensity of an input beam of light, said optically addressable light valve comprising:
    a first transparent conductor layer;
    a layer of liquid crystal; and
    a semiconductor photoconductor, said layer of liquid crystal between said first transparent conductor semiconductor photoconductor, said semiconductor photoconductor including a two-dimensional electron or hole gas on a side of said semiconductor photoconductor opposite said liquid crystal to form a second conductive layer, said second conductive layer disposed in said semiconductor photoconductor,
    wherein said optically addressable light valve is configured to apply a voltage across said liquid crystal and said semiconductor photoconductor.
2. The optically addressable light valve of Example 1, further comprising at least one layer of material to form said two-dimensional electron or hole gas on a side of said semiconductor photoconductor opposite said liquid crystal.
3. The optically addressable light valve of Example 2, wherein said at least one layer of material configured to form said two-dimensional electron or hole gas comprises a layer of aluminum nitride (AlN) or layer of gallium nitride (GaN) or a combination of layers of AlN and GaN.
4. The optically addressable light valve of Example 2 or 3, wherein said at least one layer of material configured to form said two-dimensional electron or hole gas comprises a compound nitrides.
5. The optically addressable light valve of Example 2, wherein said semiconductor photoconductor comprises $Ga_2O_3$ and said at least one layer of material configured to form said two-dimensional electron or hole gas comprises a layer of aluminum gallium oxide (AlGaO).
6. An optically addressable light valve configured to spatially modulate the intensity of an input beam of light, said optically addressable light valve comprising:
    a first transparent conductor layer;
    a layer of liquid crystal; and
    a semiconductor photoconductor, said layer of liquid crystal between said first transparent conductor layer and said semiconductor photoconductor; and
    at least one layer of material on a side of said semiconductor photoconductor opposite said layer of liquid crystal configured to form a two-dimensional electron or hole gas to provide a second conductor layer in said semiconductor photoconductor,
    wherein said optically addressable light valve is configured to apply a voltage across said liquid crystal and said semiconductor photoconductor.
7. The optically addressable light valve of Example 6, wherein said at least one layer of material configured to form said two-dimensional electron or hole gas comprises a layer of aluminum nitride (AlN) or layer of gallium nitride (GaN) or a combination of layers of AlN and GaN.
8. The optically addressable light valve of Example 6 or 7, wherein said at least one layer of material configured to form said two-dimensional electron or hole gas comprises a compound nitrides.
9. The optically addressable light valve of Example 6, wherein said semiconductor photoconductor comprises $Ga_2O_3$ and said at least one layer of material configured to form said two-dimensional electron or hole gas comprises a layer of aluminum gallium oxide (AlGaO).

Part IV:
1. An optically addressable light valve configured to spatially modulate the intensity of an input beam of light, said optically addressable light valve comprising:
    a first transparent conductor layer;
    a layer of liquid crystal;
    a photoconductor comprising a semiconductor, said liquid crystal between said first transparent conductor layer and said semiconductor photoconductor; and
    a reflector,
    wherein said optically addressable light valve is configured to apply a voltage across said liquid crystal and said semiconductor photoconductor.
2. The optically addressable light valve of Example 1, wherein said reflector comprises a dielectric mirror.
3. The optically addressable light valve of any of the example above, wherein said reflector comprises a multilayer.
4. The optically addressable light valve of Example 3, wherein said multilayer comprises an optical interference stack.
5. The optically addressable light valve of any of the example above, wherein said reflector is on the same side of said layer of liquid crystal as said semiconductor photoconductor.
6. The optically addressable light valve of any of the example above, wherein said reflector is between said semiconductor photoconductor and said layer of liquid crystal.
7. The optically addressable light valve of any of the examples above, further comprising a projector configured to provide a control beam having a wavelength sufficiently short to excite photocarriers in said semiconductor photoconductor.
8. The optically addressable light valve of Example 7, wherein said control beam is directed through said liquid crystal to said semiconductor photoconductor.
9. The optically addressable light valve of Example 7 or 8, wherein said reflector is configured to transmit said wavelength of said control beam.
10. The optically addressable light valve of any of the examples above, wherein said reflector is configured to reflect the input beam to be patterned by said optically addressable light valve.
11. The optically addressable light valve of any of the examples above, wherein said reflector is on the opposite side of said photoconductor as said liquid crystal.
12. The optically addressable light valve of any of the examples above, further comprising a heat sink and/or cooling device, said reflector disposed between said heat sink and/or cooling devices and said liquid crystal.

13. The optically addressable light valve of any of the examples above, further comprising a heat sink and/or cooling device on a side of said reflector opposite said liquid crystal.
14. The optically addressable light valve of any of the examples above, further comprising a heat sink and/or cooling device on a side of said semiconductor photoconductor opposite said liquid crystal.
15. The optically addressable light valve of any of the examples above, wherein said reflector is configured to reflect the input beam to be patterned by said optically addressable light valve such that said input beam is not incident on said semiconductor photoconductor.
16. The optically addressable light valve of any of the examples above, wherein said semiconductor photoconductor comprise ultra-wide band gap semiconductor.
17. The optically addressable light valve of any of Examples 12-14, wherein said heat sink and/or cooling device comprises a heat sink.
18. The optically addressable light valve of Example 17, wherein said heat sink comprises an open inner region surrounded by sidewalls.
19. The optically addressable light valve of Example 18, wherein said sidewalls have shape of a right circular cylinder open through a central region thereof.
20. The optically addressable light valve of any of Examples 17-19, wherein said heat sink includes a plurality of fins that provide radiative heat dissipation.
21. The optically addressable light valve of any of Examples 18-20, wherein said heat sink includes a plurality of fins extending radially away from said sidewalls.
22. The optically addressable light valve of any of the examples above, wherein said semiconductor photoconductor comprises a wide bandgap semiconductor.
23. The optically addressable light valve of any of Examples 12-14 or 17-22, wherein said heat sink and/or cooling device comprises a cooling device.
24. The optically addressable light valve of Example 23, wherein said cooling device comprise a liquid cooling system.
25. The optically addressable light valve of Example 23 or 24, wherein said cooling device comprise at least one conduits for flowing liquid.
26. The optically addressable light valve of any of Examples 23-25, wherein said cooling device comprise air or gas cooling system.
27. The optically addressable light valve of any of Examples 23-26, wherein said cooling device comprise a fan.
28. The optically addressable light valve of any of Examples 23-27, wherein said cooling device comprise a conduit, manifold, duct, or nozzle for flowing air.
29. The optically addressable light valve of any of Examples 23-28, wherein said cooling device comprise compressed air or gas cooling system.
30. The optically addressable light valve of any of Examples 23-29, wherein said cooling device comprise at least one conduit for flowing compressed air.

Part V:
1. An optically addressable light valve configured to spatially modulate the intensity of an input beam of light, said optically addressable light valve comprising:
   a first transparent conductor layer;
   a layer of liquid crystal;
   a photoconductor comprising a semiconductor, said liquid crystal between said first transparent conductor layer and said semiconductor photoconductor; and
   a pump source configured to provide a pump beam having a pump wavelength sufficiently short to excite photoelectrons on a side of said semiconductor photoconductor opposite said liquid crystal,
   wherein said optically addressable light valve is configured to apply a voltage across said liquid crystal and said semiconductor photoconductor.
2. The optically addressable light valve of Example 1 above, wherein said wavelength is sufficiently short to cause said pump beam to be absorbed within a distance that is no more than ¼ the thickness of said semiconductor photoconductor.
3. The optically addressable light valve of any of the examples above, wherein said wavelength is sufficiently short to cause said pump beam to be absorbed within a 1 to 250 microns of said semiconductor photoconductor.
4. The optically addressable light valve of any of the examples above, wherein said pump source is configured such that said pump beam is incident on said semiconductor photoconductor from the side of said semiconductor photoconductor opposite to said liquid crystal.
5. The optically addressable light valve of any of the examples above, wherein said pump source is configured such that said pump beam is not directed through said liquid crystal.
6. The optically addressable light valve of any of the examples above, wherein said wavelength of said pump beam is less than the wavelength of said input beam to be patterned by said optically addressable light valve.
7. The optically addressable light valve of any of the examples above, wherein said semiconductor photoconductor comprise ultra-wide band gap semiconductor.

Part VI:
1. An optically addressable light valve configured to spatially modulate the intensity of an input beam of light, said optically addressable light valve comprising:
   a first transparent conductor layer;
   a layer of liquid crystal;
   a photoconductor comprising a semiconductor, said liquid crystal between said first transparent conductor layer and said semiconductor photoconductor; and
   a polarizer integrated in a stack with said first transparent conductor layer, said semiconductor photoconductor, or said layer of liquid crystal or any combination thereof,
   wherein said optically addressable light valve is configured to apply a voltage across said liquid crystal and said semiconductor photoconductor.
2. The optically addressable light valve of Example 1, wherein said polarizer is integrated in a stack with said semiconductor photoconductor and said layer of liquid crystal.
3. The optically addressable light valve of any of the examples above, wherein said polarizer is integrated in a stack with said first transparent conductor layer and said layer of liquid crystal.
4. The optically addressable light valve of any of the examples above, wherein said polarizer is integrated in a stack with said first transparent conductor layer, said semiconductor photoconductor, and said layer of liquid crystal.
5. The optically addressable light valve of any of the examples above, wherein said polarizer comprises a multilayer.
6. The optically addressable light valve of any of the examples above, wherein said polarizer comprises a multilayer dielectric comprising multiple dielectric layers.
7. The optically addressable light valve of Example 5, wherein said multilayer comprises an optical interference stack.
8. The optically addressable light valve of any of the examples above, wherein said semiconductor photoconductor comprise ultra-wide band gap semiconductor.

ADDITIONAL CLAIMS

Part VII
1. An optically addressable light valve configured to spatially modulate the intensity of an input beam of light propagating in a longitudinal direction having a cross-section extending laterally in directions orthogonal to said longitudinal propagation direction, the optically addressable light valve comprising:
    a first transparent conductor layer;
    a layer of liquid crystal; and
    a photoconductor, said liquid crystal between said first transparent conductor layer and said photoconductor in said longitudinal direction,
    at least one heat sink configured to extract heat from said optically addressable light valve when light is incident thereon,
    wherein said optically addressable light valve is configured to apply a voltage across said liquid crystal and said semiconductor photoconductor.
2. The optically addressable light valve of Example 1, wherein said at least one heat sink comprises copper.
3. The optically addressable light valve of Example 1 or 2, wherein said at least one heat sink is disposed laterally with respect to said photoconductor.
4. The optically addressable light valve of any of the examples above, wherein said at least one heat sink is on opposite lateral sides of said optically addressable light valve.
5. The optically addressable light valve of any of the examples above, wherein said at least one heat sink includes at least one vent.
6. The optically addressable light valve of any of the examples above, wherein said at least one heat sink comprises at least one wall providing heat transfer from said photoconductor.
7. The optically addressable light valve of Example 6, wherein said at least one wall includes at least one vent providing access to said photoconductor.
8. The optically addressable light valve of Examples 5 or 7, further comprising a source of air or gas disposed to direct air or gas into said at least one vent.
9. The optically addressable light valve of any of the examples above, wherein said at least one heat sink comprises first and second heat sinks displaced with respect to each other in the longitudinal direction, more of said first heat sink on a first side of said photoconductor than said second heat sink and more said of said second heat sink on a second side of said photoconductor than said first heat sink.
10. The optically addressable light valve of any of the examples above, wherein said heat sink comprises an open inner region surrounded by sidewalls.
11. The optically addressable light valve of Example 10, wherein said sidewalls have the shape of a right circular cylinder open through a central region thereof.
12. The optically addressable light valve of Example 10 or 11, wherein said heatsink includes a recess in said sidewall configured such that a portion of one or more of said photoconductor, said layer of liquid crystal, or said first transparent conductor layer fits in said recess.
13. The optically addressable light valve of any of Examples 10-12, wherein said heatsink includes a support and/or contact surface configured such that a portion one or more of said photoconductor, said layer of liquid crystal, or said first transparent conductor layer is supported by and/or contacts said support and/or contact surface.
14. The optically addressable light valve of any of Examples 10-13, wherein at least a portion of at least said photoconductor is disposed within said open inner region.
15. The optically addressable light valve of any of Examples 10-14, wherein at least a portion of at least said layer of liquid crystal is disposed within said open inner region.
16. The optically addressable light valve of any of Examples 10-15, wherein sidewalls include vents providing access to said open inner region from outside said sidewall.
17. The optically addressable light valve of Example 16, wherein said vents are located proximal a front surface of said photoconductor to provide cooling thereto.
18. The optically addressable light valve of Example 16 or 17, wherein said vents are formed by an end of said sidewall comprising an edge that varies in longitudinal extend to form said vents.
19. The optically addressable light valve of Example 18, wherein said end of said sidewall includes distal edges separated by proximal edges, said distal edges extending farther distally than said proximal edges so as to form open regions between adjacent distal edges.
20. The optically addressable light valve of any of the examples above, wherein said heat sink includes a plurality of fins that provide radiative heat dissipation.
21. The optically addressable light valve of Example 20, wherein said plurality of fins extend in a direction radially away from said optically addressable light valve.
22. The optically addressable light valve of Example 21, wherein said fins include a plurality of sheets having a width extending in said longitudinal direction and length extending radially from said optically addressable light valve.
23. The optically addressable light valve of Example 22, wherein said sheets are spaced apart from each other in an array extending azimuthally about at least a portion of said optically addressable light valve.
24. The optically addressable light valve of Example 21, wherein said fins include a plurality of sheets having a width extending azimuthally about at least a portion of optically addressable light valve, a length extending radially from said optically addressable light valve, and a thickness extending in said longitudinal direction.

25. The optically addressable light valve of Example 24, wherein said sheets are spaced apart from each other in an array extending in said longitudinal direction.
26. The optically addressable light valve of any of Examples 10-19, wherein said heat sink includes a plurality of fins extending radially away from said sidewalls.
27. The optically addressable light valve of any Example 26, wherein said fins include a plurality of sheets having a width extending longitudinally along at least a portion of said sidewall and a length extending radially from said sidewall.
28. The optically addressable light valve of Example 27, wherein said sheets are spaced apart from each other in an array extending azimuthally about at least a portion of the sidewall.
29. The optically addressable light valve of Example 26, wherein said fins include a plurality of sheets having a width extending azimuthally about at least a portion of said sidewall, a length extending radially from said sidewall, and a thickness extending longitudinally along at least a portion of said sidewall.
30. The optically addressable light valve of Example 29, wherein said sheets are spaced apart from each other in an array extending longitudinally along at least a portion of the length of said sidewall.
31. The optically addressable light valve of any of Examples 20-30, wherein said plurality of fins comprise at least 10-50 fins.
32. The optically addressable light valve of any of the examples above, further comprising a nozzle configured to provide compressed gas or air for cooling.
33. The optically addressable light valve of any of the examples above, wherein said nozzle is disposed with respect to said photoconductor to direct compressed gas or air thereon.
34. An optically addressable light valve configured to be cooled comprising the optically addressable light valve of any of the examples above, further comprising at least one fan disposed with respect to said optically addressable light valve to provide air or gas flow thereto.
35. An optically addressable light valve configured to be cooled comprising the optical addressable light valve of any of the examples above, further comprising at least one fan or nozzle disposed laterally with respect to said optically addressable light valve to provide air or gas flow from a lateral direction.
36. An optically addressable light valve configured to be cooled comprising the optically addressable light valve of any of the examples above, further comprising at least one fan or nozzle disposed so as to provide air or gas flow more azimuthally about said optical addressable light valve than laterally directed at said optically addressable light valve.
37. An optically addressable light valve configured to be cooled comprising the optically addressable light valve of any of the examples above, further comprising at least one source of compressed gas or compressed air to provide air or gas to said optically addressable light valve for cooling.
38. The optically addressable light valve of any of the examples above, wherein said photoconductor comprises a semiconductor having a bandgap of at least 3.0 eV.
39. The optically addressable light valve of any of the examples above, wherein said photoconductor comprises a semiconductor having a bandgap of at least 3.5 eV.
40. The optically addressable light valve of any of the examples above, wherein said photoconductor comprises semiconductor having a bandgap of at least 4.0 eV.
41. The optically addressable light valve of any of the examples above, wherein said photoconductor comprises semiconductor having has a bandgap of at least 4.5 eV.
42. The optically addressable light valve of any of the examples above, wherein said photoconductor comprises an ultra-wide bandgap semiconductor.
43. The optically addressable light valve of any of the examples above, wherein said photoconductor comprises one or more of $Ga_2O_3$, AlN, a ternary alloy of AlN, BN, diamond, $Al_xGa_{(2-x)}O_3$ where $0 \leq x \leq 2$, or spinel gallates and aluminates such as: $ZnGa_2O_4$, $MgGa_2O_4$, $ZnAl_2O_4$, or $MgAl_2O_4$.
44. The optically addressable light valve of any of the examples above, wherein said photoconductor comprises one or more of 6H—SiC, 4H—SiC, or GaN.
45. The optically addressable light valve of any of the examples above, wherein said photoconductor comprise semiconductor having includes impurity dopants on a side of said photoconductor opposite said layer of liquid crystal to form a second conductor layer, said second conductor layer disposed in said photoconductor.
46. The optically addressable light valve of any of the examples above, wherein said photoconductor includes a second conductor layer formed in said photoconductor to provide a single monolithic structure comprising said second conductor layer and said photoconductor.
47. The optically addressable light valve of any of the examples above, wherein said photoconductor comprise semiconductor that includes deep level color centers or dopants such that the photoconductor generates photocarriers in response to receiving visible light.
48. The optically addressable light valve of any of the examples above, further comprising a second transparent conductor layer, said liquid crystal and said semiconductor photoconductor between said first and second transparent conductor layers, said optically addressable light valve being configured to apply a voltage between said first and second conductor layers.
49. The optically addressable light valve of any of the examples above, wherein said semiconductor photoconductor comprises a wide bandgap semiconductor.
50. The optically addressable light valve of any of the examples above, further comprising a sapphire substrate or window.
51. The optically addressable light valve of Examples 10, 11, or 50, further comprising a substrate or window, wherein said heat sink includes a recess in said sidewall configured such that at least a portion of said substrate or window fits in said recess.
52. The optically addressable light valve of Examples 10, 11, 50 or 51, further comprising a substrate or window, wherein said heatsink includes a support and/or contact surface configured such that at least a portion said substrate or window is supported by and/or contacts said support and/or contact surface.

53. The apparatus of any of the examples above, further comprising a liquid cooling system.
54. The apparatus of Example 53, wherein said cooling system comprise at least one conduit for flowing liquid.
55. The apparatus of any of Examples 1-52, further comprising at least one conduit for flowing liquid therethrough in thermal communication with said heat sink to extract heat therefrom.

Part VIII

1. An apparatus comprising:
   an optical element comprising optically transparent material;
   an optical path to said optically transparent material over which a laser beam can propagate to reach said optical element; and
   at least one heat sink configured to extract heat from said optical element when laser beam is incident thereon,
   wherein said at least one heat sink includes an inner open region through which said laser beam can propagate to reach said optical element.
2. The apparatus of Example 1, wherein said at least one heat sink comprises copper.
3. The apparatus of Example 1 or 2, wherein said at least one heat sink is disposed laterally with respect to said optically transparent material.
4. The apparatus of any of the examples above, wherein said at least one heat sink is on opposite lateral sides of said optically addressable light valve.
5. The apparatus of any of the examples above, wherein said at least one heat sink includes a vent.
6. The apparatus of any of the examples above, wherein said at least one heat sink comprises at least one wall providing heat transfer from said optically transparent material.
7. The apparatus of Example 6, wherein said at least one wall includes a vent providing access to said optically transparent material.
8. The apparatus of Examples 5 or 7, further comprising a source of air or gas disposed to direct air or gas into said vent.
9. The apparatus of any of the examples above, wherein said at least one heat sink comprises first and second heat sinks displaced with respect to each other in the longitudinal direction, more of said first heat sink on a first side of said optically transparent material than said second heat sink and more said of said second heat sink on a second side of said optically transparent than said first heat sink.
10. The apparatus of any of the examples above, wherein said heat sink comprises an open inner region surrounded by sidewalls.
11. The apparatus of Example 10, wherein said sidewalls have the shape of a right circular cylinder open through a central region thereof.
12. The apparatus of Example 10 or 11, wherein said heatsink includes a recess in said sidewall configured such that at least a portion of a layer of said optical element fits in said recess.
13. The apparatus of any of Examples 10-12, wherein said heatsink includes a support surface and/or contact surface configured such that at least a portion of a layer of said optical element is supported by and/or contacts said support and/or contact surface.
14. The apparatus of any of Examples 10-13, wherein sidewalls include vents providing access to said open inner region from outside said sidewall.
15. The apparatus of Example 14, wherein said vents are located proximal a front surface of said optical element to provide cooling thereto.
16. The apparatus of Example 14 or 15, wherein said vents are formed by an end of said sidewall comprising an edge that varies in longitudinal extend to form said vents.
17. The apparatus of Example 16, wherein said end of said sidewall includes distal edges separated by proximal edges, said distal edges extending farther distally than said proximal edges so as to form open regions between adjacent distal edges.
18. The apparatus of any of the examples above, wherein said heat sink includes a plurality of fins that provide radiative heat dissipation.
19. The apparatus of Example 18, wherein said plurality of fins extend in a direction radially away from said optical element.
20. The apparatus of Example 19, wherein said fins include a plurality of sheets having a width extending in said longitudinal direction and length extending radially from said optical element.
21. The apparatus of Example 20, wherein said sheets are spaced apart from each other in an array extending azimuthally about at least a portion of said optical element.
22. The apparatus of Example 19, wherein said fins include a plurality of sheets having a width extending azimuthally about at least a portion of said optical element, a length extending radially from said optical element, and a thickness extending in said longitudinal direction.
23. The apparatus of Example 22, wherein said sheets are spaced apart from each other in an array extending in said longitudinal direction.
24. The apparatus of any of Examples 10-19, wherein said heat sink includes a plurality of fins extending radially away from said sidewalls.
25. The apparatus of any Example 24, wherein said fins include a plurality of sheets having a width extending longitudinally along at least a portion of said sidewall and a length extending radially from said sidewall.
26. The apparatus of Example 25, wherein said sheets are spaced apart from each other in an array extending azimuthally about at least a portion of the sidewall.
27. The apparatus of Example 24, wherein said fins include a plurality of sheets having a width extending azimuthally about at least a portion of said sidewall, a length extending radially from said sidewall, and a thickness extending longitudinally along at least a portion of said sidewall.
28. The apparatus of Example 27, wherein said sheets are spaced apart from each other in an array extending longitudinally along at least a portion of the length of said sidewall.
29. The apparatus of any of Examples 18-28, wherein said plurality of fins comprise at least 10-50 fins.
30. The apparatus of any of the examples above, further comprising a nozzle configured to provide compressed gas or air for cooling.
31. The apparatus of Example 30, wherein said nozzle is disposed with respect to an outer surface of said optical element to direct compressed gas or air thereon.
32. The apparatus of any of the examples above, further comprising at least one fan disposed with respect to said optical element to provide air or gas flow thereto.

33. The apparatus of any of the examples above, further comprising at least one fan or nozzle disposed laterally with respect to said optical element to provide air or gas flow from a lateral direction.
34. The apparatus of any of the examples above, further comprising at least one fan or nozzle disposed so as to provide air or gas flow more azimuthally about said optical element than laterally directed at said optical element.
35. The apparatus of any of the examples above, further comprising at least one source of compressed gas or compressed air to provide air or gas to said optical element.
36. The apparatus of any of the examples above, further comprising a liquid cooling system.
37. The apparatus of Example 36, wherein said cooling system comprises at least one conduit for flowing liquid.
38. The apparatus of any of Examples 1-35, further comprising at least one conduit for flowing liquid therethrough in thermal communication with said heat sink to extract heat therefrom.
39. The apparatus of any of the examples above, wherein said optical element comprises an optically addressable light valve.
40. The apparatus of any of the examples above, wherein said optical element comprises an optical switch or optically gated transistor.

Part IX
1. An apparatus comprising:
    an optical element comprising optically transparent material,
    an optical path to said optically transparent material over which a laser beam can propagate to reach said optical element;
    a reflector having first and second sides, said reflector disposed such said at least one laser beam is incident on and reflected from said first side of said reflector; and
    at least one heat sink and/or cooling device configured to extract heat from said optical element when light is incident thereon, said at least one heat sink on said second side of said reflector.
2. The optically addressable light valve of Example 1, wherein said reflector comprises a dielectric mirror.
3. The optically addressable light valve of any of the example above, wherein said reflector comprises a multilayer.
4. The optically addressable light valve of Example 3, wherein said multilayer comprises an optical interference stack.
5. The optically addressable light valve of any of the examples above, wherein said at least one heat sink and/or cooling system comprises a heat sink.
6. The optically addressable light valve of Example 5, wherein said heat sink comprises an open inner region surrounded by sidewalls.
7. The optically addressable light valve of Example 6, wherein said sidewalls have shape of a right circular cylinder open through a central region thereof.
8. The optically addressable light valve of any of Examples 5-7, wherein said heat sink includes a plurality of fins that provide radiative heat dissipation.
9. The optically addressable light valve of any of Examples 6-8, wherein said heat sink includes a plurality of fins extending radially away from said sidewalls.
10. The optically addressable light valve of any of the examples above, wherein said at least one heat sink and/or cooling device comprises a cooling system.
11. The optically addressable light valve of Example 10, wherein said cooling system comprises a liquid cooling system.
12. The optically addressable light valve of Example 11, wherein said liquid cooling system comprises at least one conduit for flowing liquid.
13. The optically addressable light valve of any of Examples 10-12, wherein said cooling system comprises air or gas cooling system.
14. The optically addressable light valve of Example 13, wherein said air or gas cooling system comprises a fan.
15. The optically addressable light valve of Example 13 or 14, wherein said air or gas cooling system comprises a conduit, manifold, duct, or nozzle for flowing air.
16. The optically addressable light valve of any of Examples 13-15, wherein said air or gas cooling system comprises a compressed air or gas cooling system.
17. The optically addressable light valve of Example 16, wherein said compressed air or gas cooling system comprises at least one conduit for flowing compressed air.
18. The apparatus of any of the examples above, wherein said optical element comprises an optically addressable light valve.
19. The apparatus of any of the examples above, wherein said optical element comprises an optical switch or optically gated transistor.

Part X
1. An optically addressable light valve configured to spatially modulate the intensity of an input beam of light propagating in a longitudinal direction having a cross-section extending laterally in directions orthogonal to said longitudinal propagation direction, the optically addressable light valve comprising:
    a first transparent conductor layer;
    a layer of liquid crystal; and
    a photoconductor, said liquid crystal between said first transparent conductor layer and said photoconductor in said longitudinal direction,
    a substrate on an opposite side of said layer of liquid crystal as said photoconductor,
    a compressed air or gas cooling system comprising at least one nozzle disposed with respect to said photoconductor and/or said substrate to direct compressed air or gas across said photoconductor and/or substrate.
2. The optically addressable light valve of Example 1, wherein said at least one nozzle is disposed with respect to said photoconductor to direct compressed air or gas across a surface of said photoconductor to cool said photoconductor.
3. The optically addressable light valve of Example 1 or 2, wherein said at least one nozzle is disposed with respect to said substrate to direct compressed air or gas across a surface of said substrate to cool said substrate.
4. The optically addressable light valve of any of the examples above, further comprising a source of compressed air or gas coupled to said at least one nozzle to provide compressed air or gas thereto.

Part XI
1. An apparatus comprising:
    an optical element comprising at least one layer of optically transparent material; and a compressed air or gas cooling system comprising at least one nozzle disposed with respect to said optical element to direct compressed air or gas across an outer surface of said optical element to cool said optical element while a laser beam is incident on said optical element.

2. The apparatus of any of Example 1, wherein said at least one nozzle is disposed with respect to said optical element to direct compressed air or gas across said outer surface of said optical element to cool said optical element while said laser beam is incident on said optically transmissive material.

3. The apparatus of Example 1, wherein said at least one nozzle is disposed with respect to said optical element to direct compressed air or gas across said outer surface of said optically transparent material to cool said optically transparent material while said laser beam is incident on said optically transmissive material.

4. The apparatus of any of the examples above, wherein said outer surface comprises an outer surface of said optically transmissive material.

5. The apparatus of any of the examples above, further comprising a source of compressed air or gas coupled to said at least one nozzle to provide compressed air or gas thereto.

6. The apparatus of any of the examples above, wherein said optical element comprises an optically addressable light valve.

7. The apparatus of any of the examples above, wherein said optical element comprises an optical switch or optically gated transistor.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An apparatus comprising:
  an optical element comprising optically transparent material;
  an optical path to said optically transparent material over which a laser beam can propagate to reach said optical element; and
  at least one heat sink configured to extract heat from said optical element when said laser beam is incident thereon,
  wherein said at least one heat sink includes an inner open region through which said laser beam can propagate to reach said optical element, said inner open region surrounded by sidewalls, and
  wherein said sidewalls include vents providing access to said inner open region from outside said sidewall, said vents located proximal a front surface of said optical element to provide cooling thereto.

2. The apparatus of claim 1, where in said at least one heat sink comprises first and second heat sinks displaced with respect to each other in the longitudinal direction, more of said first heat sink on a first side of said optically transparent material than said second heat sink and more said of said second heat sink on a second side of said optically transparent than said first heat sink.

3. The apparatus of claim 1, wherein said sidewalls have the shape of a right circular cylinder open through a central region thereof.

4. The apparatus of claim 1, wherein said at least one heat sink includes a recess in said sidewalls configured such that at least a portion of said optical element fits in said recess.

5. The apparatus of claim 1, wherein said at least one heat sink includes a support surface and/or contact surface configured such that at least a portion of said optical element is supported by and/or contacts said support surface and/or contact surface.

6. The apparatus of claim 1, wherein said at least one heat sink includes a plurality of fins that provide radiative heat dissipation.

7. The apparatus of claim 1, further comprising a nozzle configured to provide compressed gas or air for cooling.

8. The apparatus of claim 7, wherein said nozzle is disposed with respect to an outer surface of said optical element to direct compressed gas or air thereon.

9. The apparatus of claim 1, further comprising at least one source of compressed gas or compressed air to provide air or gas to said optical element.

10. An apparatus comprising:
  an optical element comprising optically transparent material;
  an optical path to said optically transparent material over which a laser beam can propagate to reach said optical element; and at least one heat sink configured to extract heat from said optical element when said laser beam is incident thereon, wherein said at least one heat sink includes an inner open region through which said laser beam can propagate to reach said optical element, said inner open region surrounded by at least one sidewall, and wherein said at least one sidewall includes at least one vent providing access to said inner open region from outside said at least one sidewall, said at least one vent located proximal to a surface of said optical element to provide cooling thereto.

11. The apparatus of claim 10, wherein said at least one heat sink is disposed laterally with respect to said optically transparent material.

12. The apparatus of claim 10, wherein said at least one heat sink is on opposite lateral sides of said optical element.

13. The apparatus of claim 10, further comprising a source of air or gas disposed to direct air or gas into said vent.

14. The apparatus of claim 10, wherein said at least one heat sink comprises first and second heat sinks displaced with respect to each other in the longitudinal direction, more of said first heat sink on a first side of said optically transparent material than said second heat sink and more said of said second heat sink on a second side of said optically transparent than said first heat sink.

15. The apparatus of claim 10, wherein said at least one heat sink includes a plurality of fins that provide radiative heat dissipation.

16. The apparatus of claim 10, further comprising a reflector having first and second sides, said reflector disposed such that said laser beam is incident on and reflected from said first side of said reflector, said at least one heat sink on said second side of said reflector.

17. The apparatus of claim 16, wherein said reflector comprises a dielectric mirror.

18. The apparatus of claim 16, wherein said reflector comprises a multilayer.

19. The apparatus of claim 18, wherein said multilayer comprises an optical interference stack.

20. The apparatus of claim 10, further comprising at least one source of compressed gas or compressed air to provide air or gas to said optical element.

* * * * *